United States Patent [19]

Okamoto et al.

[11] Patent Number: 4,812,336

[45] Date of Patent: Mar. 14, 1989

[54] PROCESS FOR THE PRODUCTION OF PATTERNED DECORATIVE MATERIALS

[75] Inventors: Shingo Okamoto, Fuzisawa; Masao Kiryu, Zushi; Atsushi Yoshida, Yokohama, all of Japan

[73] Assignee: Nippon Oil and Fats Co., Ltd., Tokyo, Japan

[21] Appl. No.: 165,284

[22] Filed: Mar. 8, 1988

[30] Foreign Application Priority Data

| Mar. 23, 1987 | [JP] | Japan | 62-68393 |
| Jun. 15, 1987 | [JP] | Japan | 62-148780 |
| Jun. 15, 1987 | [JP] | Japan | 62-148781 |
| Jul. 27, 1987 | [JP] | Japan | 62-187246 |
| Jul. 27, 1987 | [JP] | Japan | 62-187247 |

[51] Int. Cl.$^4$ ............................................. B05D 5/00
[52] U.S. Cl. ................................ 427/257; 427/265; 427/266
[58] Field of Search .................. 427/257, 265, 266

[56] References Cited

U.S. PATENT DOCUMENTS 3,506,474 4/1970 Neuhaus et al. ............ 427/257 X
3,829,323 8/1974 Kirch ............................ 427/262

FOREIGN PATENT DOCUMENTS 58-136446 8/1983 Japan .
916986 1/1963 United Kingdom .

Primary Examiner—Evan Lawrence
Attorney, Agent, or Firm—Flynn, Thiel, Boutell & Tanis

[57] ABSTRACT

A process for the production of patterned decolative materials having a coating exhibiting artisitic relieved crepe-like patterns of soft textural feeling, which comprises printing on the surface of the substrate material selected patterns with an ink and coating over the so printed substrate with a wrinkle paint to form a coating exhibiting crepe-like relieved patterns corresponding to the selected ink patterns.

7 Claims, 1 Drawing Sheet

PROCESS FOR THE PRODUCTION OF PATTERNED DECORATIVE MATERIALS

BACKGROUND OF THE INVENTION

1. Field of the Invention

The present invention relates to a process for the production of patterned decorative materials having a coating exhibiting artistic crepe-like relieved patterns, namely, patterns of wrinkled and relieved textural appearance caused by different local shrinkages of the coated paint layer.

2. Description of the Prior Art

Processes have hitherto been known for producing pattern decorative materials having a coating exhibiting three dimensional relief patterns. For example, a process is proposed in the Japanese Patent Publication No. 57073/1986, on column 5, lines 9-28, in which a substrate material is first coated with a vinyl chloride sol paint and the coating layer is subjected, after baking the coating, to a processing by press rolling using an embossing roller to form thereon embossed patterns. In the Japanese Patent Publication No. 54470/1986, from line 23 on column 2 to line 6 on column 3, and in the Japanese Patent Publication No. 54471/1986, from line 22 on column 2 to line 5 on column 3, another technique is described in which a substrate material is coated with a paint having a resin component composed of a vinyl chloride resin including a pulverous thermoplastic resin using a coating roller in such a manner that the coating layer obtained involves a regularly repeating thickness variation to form a riffled or striped embossed pattern.

As to the wrinkle paint for producing a crepe-like pattern, those which have a resin component consisting of a modified alkyd resin obtained with a drying oil having unsaturated double bond, such as, China wood oil, oiticica oil or so on, and containing a considerable amount of dryer consisting of an organic salt of cobalt or manganese have found hitherto their practical applications [Cf. the Japanese magazine "Toso-Gijutsu" April, p. 45 (1964)].

A further technique has been proposed in which a wrinkle paint is prepared using, as the essential resin component, cellulose acetate butyrate resin, an epoxy resin and a urea resin together with an acid catalyst and an amine catalyst ["Official Digest" March, p. 298-310 (1962)].

These prior art techniques for producing patterned decorative material having a coating with embossed patterns exhibit, however, disadvantages. For example, in the process employing an embossing roller, an additional procedure for preparing embossed patterns is required, resulting thus in an increase in the production costs, and, in addition, the coating layer becomes thin at the corner of each embossment caused from the sharp cant thereof, bringing about a weakening of the coating and a reduction of the strength to external aggressive influences at such portions. In the process using a paint containing vinyl chloride resin having incorporated therein a pulverous thermoplastic resin, a thickness of the coating layer of 150-250 $\mu$m in the protruding areas is required for attaining a three dimensional feeling by the embossed patterns, whereby the productivity becomes lower and the production costs are high. In the case of employing vinyl chloride resin, a plasticizer is incorporated in general. Plasticizers are subject to aging, whereby the coating layer will, in general, become harder after a prolonged period of time.

In the case of using the conventional wrinkle paint with the drying oil having an unsaturated double bond, a relatively thick coating layer is required for attaining a sufficient performance of the coating layer and for obtaining preferable crepe-like patterns. It is necessary to cause the coating layer to harden up to the internal bulk thereof by placing the coated article in an oven maintained at a temperature of 60°-100° C., after almost all the low boiling solvent has been volatilized off, whereupon the temperature of the heating box is raised up to 100°-150° C. after 10-20 minutes where crepe-like patterns have been formed over the entire surface. In addition, the paint is apt to form coverage skin layer during storage, requiring thus a sufficient caution for its storage and filtration should be incorporated before practical use of the paint for removing the coverage skin layer. Furthermore, the paint after storage for a long period of time develops crepe-like patterns only with difficulty and they are inferior in the strength against external aggressive influences and in the weatherability.

In the case of wrinkle paint having as the main components cellulose acetate butyrate resin, an epoxy resin and an urea resin, together with an acid catalyst and amine catalyst, a thickness of the coating layer of more than about 100 $\mu$m is necessary for obtaining acceptable crepe-like patterns. The mutual reaction due to the employment of an epoxy resin, an acid catalyst and an amine catalyst renders the storage stability of the paint inferior, so that it cannot be stored over 9 weeks. Moreover, the weatherability of the paint is quite inferior due to the employment of epoxy resin.

When these conventional wrinkle paints are coated on a substrate directly, textural artistic relief patterns cannot be obtained, even though a crepe-like pattern uniformly developed over the whole surface may be formed.

SUMMARY OF THE INVENTION

An object of the present invention is to provide a novel process for the production of patterned decorative materials which enables the above disadvantages to be eliminated.

Another object of the present invention is to propose a process for the production of patterned decorative materials which enables one to produce artistic crepe-like relief patterns of textural feeling employing simple procedures at lower costs.

Thus, the present invention concerns a novel process for the production of patterned decorative materials having a coating exhibiting crepe-like relieved patterns, which comprises printing on the substrate surface selected patterns with an ink and then coating on the so printed substrate with a wrinkle paint to form a coating with crepe-like relieved patterns corresponding to the ink patterns.

DETAILED DESCRIPTION OF THE INVENTION

Figure 1:
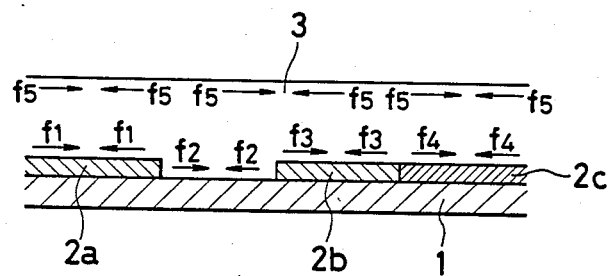
FIGS. 1 and 2 are schematic drawings depicting the course of formation of the coating with crepe-like relieved patterns.

For the substrate materials to be employed in the process according to the present invention, it is enough to employ those which will withstand the conditions of hardening of the wrinkle paint required for forming the crepe-like relieved patterns and there is no restriction in their configurations and so on. Thus, materials based on wood, such as, wood plates, plywood, particle boards and so on, materials based on gypsum, such as, gypsum boards and gypsum-slag boards, materials based on fibered cement, such as, pulp-cement boards, asbestos-cement boards, woodchips-cement boards and so on, materials based on metal, such as, iron, aluminum, copper, stainless steel, titanium, zinc and so on, materials based on paper, materials based on stone and rock, materials based on glass, materials based on plastics, ceramic tiles and composite materials composed of the above various materials may preferably be used.

The substrate materials may have every configuration, such as, plate, curved plate, molded shapes and so on.

The ink to be used for printing on the substrate surface before coating it with the wrinkle paint may be any one which is usually employed for printing, such as, typographic inks, lithographic inks, flexographic inks, screen printing inks and gravure inks, among which a suitable one may be chosen for each specific substrate material.

For effecting the printing with the ink, any selected artistic pattern is printed with an ink as mentioned above on the substrate surface to form a printing layer thereon. For effecting the practical printing of such a selected artistic pattern with the ink chosen, every selected printing technique can be employed, for example, gravure printing, gravure offset printing, lithographic offset printing, die-lithographic printing, copper plate printing, typographic printing, jet printing, silk screen printing, flexographic printing and electrostatic printing. For printing on a metal plate, such as steel sheet or so on, it may be pretreated beforehand by a primer coating, base coating and so on.

On the substrate which has been printed with an ink in a pattern of a selected configuration, a wrinkle paint is applied to form a coating with a crepe-like relieved pattern. A wrinkle paint is one which can form a coating having a crepe-like pattern. An example of such a wrinkle paint is disclosed in U.S. Pat. No. 3,506,474. When a wrinkle paint brings forth a fine crepe-like surface structure, the coating will have an opaque appearance.

Such a crepe-like pattern can be obtained by a wrinkle paint having a film-forming component consisting of a thermosetting resin, such as, an acrylic resin, an oil-modified polyester resin, an oil-free polyester resin, a silicone-polyester resin, a fluororesin, a polyol resin for urethane paint, a polyether resin, a phenol resin or a modified resin of them. The use of the wrinkle paint having a film-forming component consisting of such a thermosetting resin is preferable, because it permits dispensing with the incorporation of plasticizer, as in the case of employment of a vinyl cloride resin, and deterioration by age of the coating layer will thus be avoided.

Examples of such a wrinkle paint include those based on phenol resin, such as, Wrinkle (Trademark) of the firm Ohashi Chemicam Ind. Ltd., Japan, and those based on a polyester resin, such as Wrinkle Finish, Polyester F5-552 and Polyester F5-556 (all Trademarks) of the firm AB Svensk Forgindustry, Wrinkle Polylure No. 2000 (Trademark) of the firm The Glidden Co., Polylure Nos. 2000WR, 2100WR, 2200WR (Trademarks) of the film Nippon Oils & Fats Co., Ltd. and SANCOAT-No. 2040 and SANCOAT-No. 7040 (both Trademarks) of the firm Nagashima Special Paint K. K., the film-forming resin of which is unknown, etc.

These wrinkle paints can be used for enamel paint and clear colored paint containing dyestuff, organic pigment, inorganic pigment etc. as well as for clear paint without such dyestuff or pigment. A wrinkle paint for use as a clear colored or a clear paint may preferably be such a one which does not cause any yellowing upon curing of the paint. Such a wrinkle paint comprises the following three components (A) to (C):

Typical paint of this type has the resin component comprising (A) 40-95 parts by weight of a hydroxyl group-containing polymer, (B) 5-60 parts by weight of an oligonuclear melamine resin containing at least 40% by weight of a hexakisalkoxymethyl melamine expressed by the general formula (I).

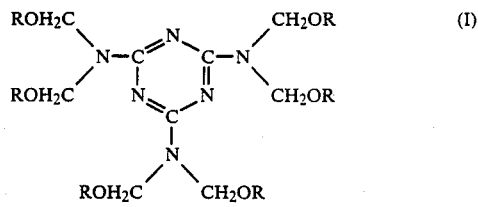

in which each R stands for an aklyl group and at least three of these R groups are methyl and less than three are each an aklyl having 2-5 carbon atoms, and (C) 0.1-5 parts by weight of a sulfo-compound, calculated on the basis of free acid compound, per 100 parts by weight of the total sum of the above (A) and (B), the sulfonic acid group of said sulfo-compound being masked by an amine having secondary and/or tertiary amino group(s) and having a boiling point of 50°-300° C.

For the resin component (A) having in the molecule hydroxyl group(s), every hydroxyl group-containing resin generally used in paints can be used without any restriction. Examples of such hydroxyl group-containing resin include hydroxyl group-containing acrylic resins; polyester resins, such as, oil-modified polyester resins, oil-free polyester resins, silicon-modified polyester resins, polyol resins for urethane paint and so on; and fluororesins, which are all available as commercial products.

As the hydroxyl group-containing acrylic resin, there may be enumerated "Almatexes 749-7, 748-5M, 749-17AE, 748-16AE, 781-26, 781-27, 782-5, 784, 785-5, 762LV55A, D-102, D-103, D-105 and D-151" (Trademarks) of the firm Mitsui Toatsu Chemicals, Inc. and "Acrydics A-405, A-406, A-407, A-409, 46-544, 52-101, A-418, 54-172-60, 53-580, A-412-70-S, A-413-70-S, A-416-70S, A-501-LV, 44-590, 44-475, A-602-50-S, A-606-50-S, 47-712, 44-179, A-801, A-801-P, A-802, A-804, A-807, A-808, A-809, A-810-45, A-811, A-814, A-815-45, A-817, A-851, A-852, 44-127, 44-198, 47-567, 48-443, 48-443, 48-261, 49-380, 49-394-1M, 50-257-55, 51-371, 52-614, 52-666 and 52-668" (Trademarks) of the firm Dainippon Ink and Chemicals, Inc.

For the hydroxyl group-containing oil-modified polyester resins, there may be exemplified "Beckolite M-6601-60-S" (Trademark) of the firm Dainippon Ink and Chemicals, Inc.

For the hydroxyl group-containing oil-free polyester resins, there may be enumerated, for example, "Beckolites M-6602-60-S, M-6401-50, M-6402-50, M-6003-60, M-6005-60, M-6007-60, 48-312, 49-376, 46-169-S, M-6201-40-IM, M-6204-50-S and M-6204-50-S" (Trademarks) of the firm Dainippon Ink and Chemicals, Inc.; "Almatexes P-645, P-646, P-647BC, HMP15, HMP25 and HMP34" (Trademarks) of the firm Mitsui Toatsu Chemicals, Inc.; "Dynapols 829, LH790, LH812 and LH821" (Trademarks) of the firm Dynamit Nobel Chemie; "Synresates W8360SL, W86270F, W86355SF and W86560SKK" (Trademarks) and "Uralacs 108-RA8-50 and 108-RA8Al-50" (Trademarks) of the firm DSM Resins International BV.

Examples of the hydroxyl group-containing silicone-modified polyester resins include "Synresates D-9960W", "Synedol1515UF" and "Uralac S2655-Al-60" (all Trademarks) of the firm DSM Resins Int. BV.

For the hydroxyl group-containing polyol resins for urethane paint, there may be enumerated, for example, "Burnocks D-210-80, D-161, D-150-70, D-130-75, DE-140-70 and DF-30-55" (Trademarks) of the firm Dainippon Ink and Chemicals, Inc.

For the hydroxyl group-containing fluororesins, there may be employed, for example, "Lumiflon (Trademark) of the firm Asahi Glass Co., Ltd. and "Cefral Coat" (Trademark) of the firm Central Glass Co., Ltd. etc.

These hydroxyl group-containing resins can be used alone or in mixtures of two or more of them. They can be incorporated in the paint in an amount, calculated as solids, of 40–50 parts by weight, preferably 60–90 parts, based on the total weight of the resin content.

If the amount of these hydroxyl group-containing resin is short of 40 parts by weight, the reaction thereof with the oligonuclear melamine resin becomes insufficient, whereby a crepe-like pattern of relieved appearance will be difficult to obtain due to the fluctuation in the baking conditions and, in addition, the processibility and the coating performances, such as, fastness to external influences and weatherability, will be decreased. If the amount exceeds 95 parts by weight, a sufficient cross linking will not be achieved due to the too low proportion of the oligonuclear melamine resin, whereby the processibility and coating performances, such as fastness against external influences and durability will be decreased and, in addition, an attainment of crepe-like patterns having textural feeling will become difficult.

The oligonuclear melamine resin of the above component (B) to be incorporated in the wrinkle paint according to the present invention serves for effecting curing of the coating and contains a hexakisalkoxymethyl melamine (abbreviated hereinafter as HAMM) expressed by the general formula (I) in an amount of at least 40% by weight as determined by a gel permeation chromatography (GPC).

The alkyl group represented by R in the general formula (I) having 2-5 carbon atoms other than methyl group may be ethyl, propyl, iso-propyl, butyl, iso-butyl, pentyl, iso-pentyl and so on.

The oligonuclear melamine resin as defined above contains more alkyl groups per unit weight as compared with polynuclear (highpolymeric) melamine resin employed in general for paint. This specific high content of the functional group is essential for forming the relieved crepe-like pattern. Use of a polynuclear melamine resin will not form any relieved crepe-like pattern due to high viscosity of such polynuclear melamine resin causing the entire coating layer to be too viscous.

If a urea resin or a urea resin with a partially alkylated secondary amine was employed for the curing agent, the storage stability of the paint obtained became inferior and a brittle coating layer was formed, resulting in an inferior processibility and debased coating performances such as weatherability etc., since the reaction of the urea resin with the hydroxyl group-containing resin proceeded at a considerably high velocity as compared with the case of using oligonuclear melamine resin.

When the oligonuclear melamine resin consists of, as main component, an HAMM in which three or more of the functional alkyl groups are methyl and less than three thereof stand each for an alkyl having 2-5 carbon atoms, a relieved crepe-like pattern will be formed by the cross-linking reaction effected between the hydroxyl group in the hydroxyl group-containing resin and the methoxy group. If three or more of the functional alkyl groups contain 2-5 carbon atoms, the relieved crepe-like pattern will scarcely or not be formed, since such a functional group will react with the hydroxyl group more slowly as compared with methoxy group.

Examples of the practical oligonuclear melamine resin of the class as mentioned above include "Cymels 300, 301, 303, 1130-266J and 1130-285J" (trademarks) of the firm Mitsui Toatsu Chemicals; "Nikalacs MW-30M, MW-30, MX-40, MX-485 and MW-22" (Trademarks) of the firm Sanwa Chemicals Co., Ltd.; "Sumimals M-100C and M-40S" (Trademarks) of the firm Sumitomo Chemical Co., Ltd. and "Resimins 745, 747, 753 and 755" (Trademarks) of the firm Monsanto Chemical Co. They may be used solely or in mixture.

The amount of the oligonuclear melamine resin employed may be 5–60 parts, preferably 10–40 pats, as calculated as solids, based on the total weight of the paint.

If the amount is less than of 5 parts by weight, a cured coating layer having sufficient strength will not be obtained and a relieved crepe-like pattern will be difficult to form, with a simultaneous decrease in the coating performances such as processibility, fastness against external influences and weatherability etc. If the amount exceeds 60 parts by weight, the coating layer obtained becomes brittle and the coating performances, such as processibility, fastness against external influences and weatherability are inferior. Attainment of relieved crepe-like patterns is also difficult due to the fluctuation in the baking conditions.

The above mentioned component (C), namely, the sulfo-compound of which sulfonic acid group is masked by an amine compound containing secondary and/or tertiary amino group(s) having a boiling point of 50°–300° C. is a curing catalyst (expressed hereinafter as blocked acid catalyst). The blocked acid catalyst consisting of one or more sulfo-compounds of which the sulfonic acid group is blocked by an amine compound as defined above, said sulfo-compounds being selected from the group consisting of aromatic sulfonic acids, such as, p-toluenesulfonic acid, dodecylbenzenesulfonic acid, dinonylnaphthalenesulfonic acid and dinonylnaphthalenedisulfonic acid, and aliphatic sulfonic acids, such as those represented by the following structural formulae (ii)–(IX):

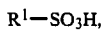 (II)

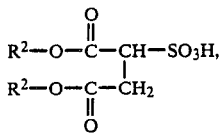 (III)

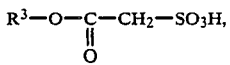 (IV)

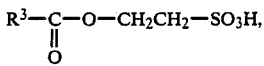 (V)

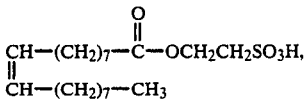 (VI)

$R^1O—(CH_2)_{2-3}SO_3H$, (VII)
$R^1OCH_2CH_2OCH_2CH_2SO_3H$ (VIII)
and
$R^1SCH_2CH_2SO_3H$, (IX)

wherein $R^1$ represents an alkyl group having 8–22 carbon atoms, $R^2$ denotes an alkyl group having 4–8 carbon atoms and $R^3$ is an alkyl group having 13–17 carbon atoms.

Use of an aliphatic sulfonic acid is preferable, since aliphatic sulfonic acids have superior solubility as compared with aromatic sulfonic acids and will thus scarcely bring about seedy or uneven coating due to crystallization. Free aliphatic sulfonic acids can be obtained by decationation, namely removal of salt cation, of corresponding aliphatic acid metal salts employed in general as a surface active agent, whereby to obtain the free acid compound.

As the starting raw materials for the aliphatic sulfonic acid salts, there may be employed, for example:

 (X)

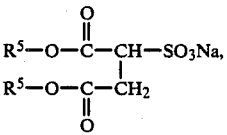 (XI)

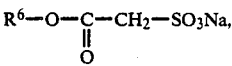 (XII)

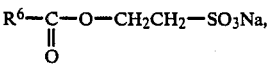 (XIII)

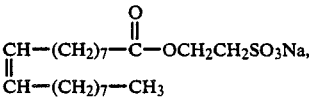 (XIV)

$R^4O—(CH_2)_{2-3}SO_3Na$, (XV)
$R^4OCH_2CH_2OCH_2CH_2SO_3Na$ (XVI)
and
$R^4SCH_2CH_2SO_3Na$, (XVII)

where $R^4$ represents an alkyl group having 8–22 carbon atoms, $R^5$ denotes an alkyl group having 4–8 carbon atoms and $R^6$ is an alkyl group having 13–17 carbon atoms.

For the concrete manner of the decationation of the aliphatic sulfonic acid salts, acid treatment thereof with an inorganic acid may be employed. For the aliphatic sulfonic acids having carbon atoms less than 4, they have less solubility in organic solvents, as was the case for the heretofore employed aromatic sulfonic acids. As the inorganic acid, commonly employed acids, such as, sulfuric acid, hydrochloric acid, nitric acid, phosphoric acid and so on, can be used. While there is no restriction as to the amount of inorganic acid to be employed, it is preferable to use it in an amount in the range from 0.5 to 1.5 times, in equivalent, of the amount of aliphatic sulfonic acid salt, in order to exclude any deterioration in the coating performance, in particular, water resistance. If the amount of inorganic acid employed is less than 0.5 times, in equivalent, of the aliphatic sulfonic acid salt, some of the salt will remain unreacted and, on the other hand, if the amount of acid is greater than 1.5 times, in equivalent, of the salt, by-products other than free acid will be formed, so that in both cases a debasement in the water resistance will be caused. The decationation can be attained in the usual way at room temperature by a quantitative reaction.

For other acid catalysts, organic carboxylic acids, such as maleic acid, phthalic acid and carboxyl group-containing polyols, as well as acids based on phosphate may be considered, though they exhibit lower catalytic activity and thus bring about weak effect of acceleration of cross-linking reaction that causes the crepe-like pattern under the combination with the oligonuclear melamine resin mentioned above.

For the amine compound having a boiling point in the range of 50°–300° C. containing secondary amino group(s) to be employed as the masking agent, there may be enumerated, for example, diethylamine, dipropylamine, diisopropylamine, dibutylamine, diisobutylamine, di-2-ethylhexylamine, di-secbutylamine, diallylamine, N-methylhexylamine, 3-pipecoline, 4-pipecoline, 2,4-lupetidine, 2,6-lupetidine, 3,5-lupetidine, morpholine, N-methylbenzylamine and so on. For the amine compounds having tertiary amino group(s), there may be enumerated, for example, N-methylmorpholine, triethylamine, tributylamine, N,N-dimethylallylamine, N-methyldiallylamine, triallylamine, N,N,N',N'-tetramethyl-1,2-diaminoethane, N,N,N',N'-tetramethyl-1,3-diaminopropane, N,N,N',N'-tetraallyl-1,4-diaminobutane, N-methylpiperidine, pyridine, 4-ethylpyridine, 4-(5-nonyl)-pyridine and so on. For the amine compounds having secondary and tertiary amino groups, there may be enumerated, for example, imidazole, N-methylpiperidine and so on. These amine comounds can be used solely or in a mixture of two or more of them.

For obtaining the free aliphatic sulfonic acids represented by the above structural formulae (II)–(IX), it is enough to treat corresponding alkali metal salts by decationation to form free acid.

The blocked acid catalyst can be prepared simply by bringing together the amine compound having secondary and/or tertiary amino group(s) with the free sulfonic acid compound in a vessel and agitating the mixture at 20°–30° C. for 10–20 minutes.

The mole ratio of the amine compound to the sulfo-compound should be in the range from 0.5 to 7, preferably from 1 to 5. Only at a mole ratio in the range as defined above, will there be formed a beautiful relieved pattern of crepe-like structure. If the mole ratio of amine compound to sulfo-compound is less than 0.5, the storage stability of the paint becomes inferior due to the existence of a considerable proportion of free acid and, in addition, no satisfactory relieved pattern with textural crepe-like structure will be formed due to premature starting of the curing reaction from a lower temperature on baking the coating. If, on the other hand, the mole ratio exceeds 7, no improvement of the masking effect will be attained by the increase in the amount of amine compound but, rather, a drawback appears in that the curing reaction is retarded and a satisfactory crepe-like pattern of relieved appearance is not obtained, besides a possible debasement in the processibility, corrosion resistance and weatherability of the coating obtained.

The amount of the blocked acid catalyst to be used should be in the range from 0.1 to 5 parts by weight, preferably from 0.2 to 4 parts by weight, calculated as free sulfonic acid compound, per 100 parts by weight of the total amount of the polyester resin having hydroxyl groups and the oligonuclear melamine resin. If this amount is lower than 0.1 parts by weight, the catalytic activity upon baking of the coating layer will be insufficient and no satisfactory relieved pattern having beautiful crepe-like appearance will be formed, with simultaneous decrease in the corrosion resistance and weatherability of the coating obtained. It is not necessary to use the acid catalyst in an amount over 5 parts by weight per 100 parts by weight of the total amount of the polyester resin and the melamine resin, since it causes no increase in the effect of formation of beautiful crepe-like pattern but rather causes hindrance in the formation of crepe-like pattern and decrease in the coating performance, such as, processibility, corrosion resistance and weatherability.

By applying the wrinkle paint comprising the above three components (A) to (C) according the present invention over the surface of a substrate on which a pattern has been printed with a printing ink, a crepe-like relieved pattern corresponding to the printed pattern on the substsrate can be formed. The wrinkle paint according to the present invention may be formulated as a clear paint comprising said three essential components.

It is also possible to formulate the wrinkle paint according to the present invention as a clear colored paint or an enamel paint, by incorporating in the mixture of said essential components (A) to (C) dyestuffs, such as, oil-soluble dyestuffs, dispersible dyestuffs and so on; organic pigments, such as, azo-pigments, phthalocyanine pigments, lakes, quinacridone pigments and dioxazine pigments; inorganic pigments, such as, titanium oxide, iron oxide and carbon black; metal powders, such as, aluminum powder, copper powder and so on; and extender pigments, such as, powdery talcum, barium sulfate, silica powder, barium carbonate, alumina white, clay, calcium silicate, precipitated magnesium carbonate and so on. By selecting each specific additive, a crepe-like pattern with varying textural appearance can be formed.

Both in a clear paint, there can be employed clear colored paint and enamel paint, film forming materials consisting of thermoplastic resin without hydroxyl group, such as, a fluororesin, a vinyl copolymer, a polyethylene resin, a polypropylene resin and a polyester resin.

These additives, such as, dyestuffs, organic and inorganic pigments, metal powders, extender pigments, other film-forming resins etc., may be incorporated in the paint formulation in an amount less than 50 parts by weight per 100 parts by weight of the total amount of solids in the paint. A suitable selection of these additives will have corresponding influence upon the size of the crepe-like pattern obtained. If the amount of such additives exceeds 50 parts by weight per 100 parts by weight of the total solid amount of the paint, the coating performance, such as, corrosion resistance, processibility and so on will decrease.

It is possible to incorporate in the wrinkle paint, if necessary, other additives, such as, antifoaming agent, levelling agent, dispersing agent for pigment, ultraviolet ray absorbing agent, light-stabilizer and stabilizer to heat. There can be produced a crepe-like pattern of hammertone, by incorporating an additive based on silicone resin to cause intentionally a repelling effect of the coated film.

The wrinkle paint composition explained above may, on requirement, be diluted with a solvent, such as xylol etc., to a viscosity suitable for application and can be applied on a substrate using an application device, such as, roller coater, flow coater, roller flow coater, barcoater, spray gun or an electro-static spray coating machine. The thus obtained coating is baked at a temperature of 100°–400° C., preferably from 120°–300° C. for 10 seconds–60 minutes, preferably for 30 sec.–30 min. to form a coating film having a dry film thickness of 10–100 $\mu$m, preferably 15–80 $\mu$m. During these procedures, a crepe-like pattern appears over the coating surface in a form corresponding to the printed pattern formed preliminarily on the substrate, whereby a patterned decorative material having a relieved pattern of crepe-like appearance corresponding to the print pattern on the substrate.

When the thickness of the dry coating film of the wrinkle paint is less than 10 $\mu$m, a crepe-like pattern with satisfactory soft relieved appearance will not be formed. If, on the other hand, it exceeds 100 $\mu$m, the crepe-like pattern obtained will exhibit a non-uniform appearance and is not preferable.

While the mechanism for the formation of crepe-like pattern under the use of the wrinkle paint according to the present invention comprising said three essential components (A) to (C) has not yet been made quite clear, it may be, as the inventors believe, due to the occurrence of so-called superficial local drying of the coated paint layer in which the surface hardening of the coating layer proceeds quite promptly upon reaching a certain baking temperature of the uncured coating layer. It is assumed that the crepe-like pattern is formed after application of the wrinkle paint according to the present invention by such a vigorous progress of the surface hardening upon baking of the coating layer under the use of the oligonuclear melamine resin having a considerable number of methoxy groups exhibiting relatively higher reactivity for reacting with the hydroxyl group in the polymer under the presence of a blocked acid catalyst.

By applying the wrinkle paint over the substrate on which a pattern has been printed with a printing ink and by subsequently baking the resulting coating, different shrinking stresses will appear in the coating film at different portions over the substrate according to the condition of absence or presence of printed pattern of the printing ink on the substrate in these portions or even by the difference in the nature of such printing layer. These different shrinking stresses will cause a relieved pattern of crepe-like appearance having different relieving strengths in various portions, different coating thicknesses and different configurations to realize an artistic relieved pattern having a crepe-like textural appearance.

Figure 2:
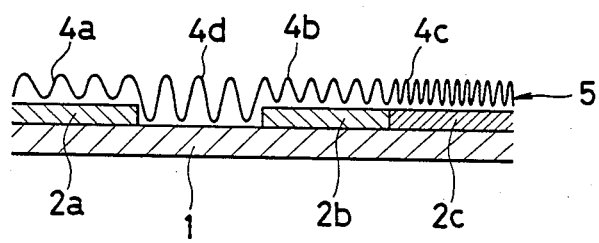

FIGS. 1 and 2 depict the possible course of formation of the relieved crepe-like pattern over the coating each in a schematic illustration. In FIG. 1, the substrate 1 has different printing layers 2a, 2b and 2c, over which the wrinkle paint coating layer 3 is applied. In FIG. 2, different crepe-like patterns 4a, 4b, 4c and 4d are formed over the substrate 1 in the coating layer 5.

Using different printing inks, printing layers 2a, 2b, 2c and so on are printed on the substrate 1, over which a wrinkle paint coating layer 3 is applied. Upon curing of the coating layer, different shrinking stresses $f_1$–$f_4$ will appear in the coating layer as ahown in FIG. 1. Another shrinking stress $f_5$ appears also in the coating layer at a portion distant from the substrate surface. Due to these different shrinking stresses, a corresponding crepe-like coating layer 5 with different patterns 4a–4d each present on each printing layer will be formed as illustrated in FIG. 2. The so formed pattern has a relieved appearance and corresponds to the pattern of the printing layer. By the crepe-like appearance developed over the entire surface of the coating, it provides a soft textural feeling.

This is assumed to be based on the fact that different crepe-like structures will be brought about in different portions according to the condition whether or not there is a printing layer 2a, 2b etc. beneath such portions, whereby different light reflection characteristics are realized over these different portions either for clear paint and for enamel paint, which will cause different visual impressions over these different portions to bring about such a relieved soft textural feeling.

In the cases of clear paint and clear colored paint, the printing patterns 2a, 2b etc. preliminarily printed on the substrate are visualized as relieved patterns due to the transparency of the covering paint coating layer. By the crepe-like structure of the coating layer over the crepe-like patterns 4a, 4b, . . . , a soft textural feeling will be obtained.

The color of the print on the substrate is not discriminable in an enamel paint. However, a relieved pattern having a soft feeling is imparted to the crepe-like patterns, since they appear in a silhouette.

While the crepe-like surface structure is indicated in FIG. 2 schematically by a simple waving, a typical crepe-like pattern has a structure in which many principal ridges run zigzag and branch into many side ridges with wrinkles and fine ruffles entangling thereinto, like a mountain chain, exhibiting thus some artistic relief patterns. The actual configurations and sizes of these patterns 4a, 4b, . . . depends on the material and geometric condition of the surface of the substrate, presence or absence of the ink print layer 2a, 2b, . . . etc. and the resin and pigment components of the paint used. By a suitable choice of these conditons, selected relieved crepe-like patterns can be obtained.

Thus, it is possible, according to the present invention, to obtain beautiful patterned decorative materials, which have a coating exhibiting relieved crepe-like patterns with soft textural feeling and are excellent in the processibility, corrosion resistance, weatherability and so on, at low costs, by simply applying the wrinkle paint according to the present invention exhibiting a superior storage stability on various substrates on which selected patterns have been printed with a printing ink, without necessitating complicated procedures, such as those required in conventional embossing work etc., even if the wrinkle paint according to the present invention is coated in a film thickness less than 100 μm.

DESCRIPTION OF PREFERRED EMBODIMENTS

In the following, the present invention will further be described in detail by way of Examples and Comparison Examples, in which % and part as given represent both on weight bases.

Preparation of Aliphatic Sulfonic Acids (1) Dodecanesufonic acid ($C_{20}H_{41}SO_3H$)

In a three neck flask equipped with a stirrer, there were charged 384 parts of sodium dodecane sulfonate ($C_{20}H_{41}SO_3Na$) and 861.4 parts of n-butyl alcohol. To this mixture, 98.1 parts of 37.2% hydrochloric acid were added while agitating the mixture at room temperature to effect decationation. The reaction proceeded at once upon the addition of hydrochloric acid, whereby 58.5 parts of NaCl were precipitated. By filtrating off the precipitated NaCl with aspiration, a 25% solution of the resulting aliphatic sulfonic acid was obtained.

(2) Octadecyloxyethylsulfonic acid ($C_{18}H_{37}OCH_2CH_2SO_3H$)

In a three neck flask equipped with a stirrer, 400 parts of sodium octadecyloxyethyl sulfonate ($C_{18}H_{37}OCH_2CH_2SO_3Na$) and 959.4 parts of n-butyl alcohol were charged. The decationation was effected by adding thereto 102.6 parts of 61.4% nitric acid while stirring the mixture at room temperature. The reaction proceeded at once after the addition of nitric acid, whereby 71 parts of $Na_2SO_4$ were precipitated. The precipitate was filtered off with aspiration to obtain a 25% solution of the resulting free aliphatic sulfonic acid.

(3) Oleyloxyethylsulfonic acid [$CH_3(CH_2)_7CH=CH(CH_2)_7COOCH_2CH_2SO_3H$]

In a three neck flask equipped with a stirrer, 412 parts of sodium oleyloxyethyl sulfonate [$CH_3(CH_2)_7CH=CH(CH_2)_7COOCH_2CH_2SO_3Na$] and 698.4 parts of methyl ethyl ketone were charged. The decationation was effected by adding thereto 98.1 parts of 37.2% hydrochloric acid while agitating the mixture at room temperature. The reaction proceeded at once after addition of hydrochloric acid, whereby 58.5 parts of NaCl were precipitated. The precipitate was filtered off with aspiration to obtain a 25% solution of the resulting free aliphatic sulfonic acid.

(4) Octadecylsulfonic acid ($C_{18}H_{37}SO_3H$)

In a three neck flask equipped with a stirrer, 356 parts of sodium octadecyl sulfonate ($C_{18}H_{37}SO_3Na$) and 861.4 parts of n-butyl alcohol were charged. The decationation was effected by adding thereto 98.1 parts of 37.2% hydrochloric acid while stirring the mixture at room temperature. The reaction proceeded at once after addition of hydrochloric acid, whereby 58.5 parts of NaCl were precipitated. The precipitate was filtered off with aspiration to obtain a 25% solution of the resulting free aliphatic sulfonic acid.

Preparation of Coating Test Panels

Test Panel 1

On a galvanized steel plate having a thickness of 0.35 mm, which had been subjected to a chemical surface treatment, a layer of primer coating was applied using a roller coater with a primer paint Precolor Primer NP-14 (Trademark) of the firm Nippon Oils & Fats Co., Ltd.

and the plate was baked at 250° C. for 60 seconds to obtain a primer coating having a thickness of dry coating film of 5 μm. On the so precoated plate, a base coat was applied using a roller coater with Precolor No. 3100 Special White (Trademark) of the firm Nippon Oils & Fats Co. and the so coated plate was baked at 250° C. for 60 sec. to obtain a base coating having a dry coating film thickness of 10 μm. On this base coat, a pattern was printed with a printing ink formulated by diluting a commercial metal printing ink "MZ-R-561 Yellow" (Trademark) of the firm Tokyo Printing Ink Mfg. Co., Ltd. with ethylene glycol monobutyl ether to a viscosity of 500 poise (25° C.), using a roller coater in a printing layer thickness of 1.5 μm. On this plate, a further pattern of another printing ink "MZ-R-3003 Rouge" (Trademark) of the firm Tokyo Printing Ink formulated beforehand in the same manner as MZ-R-561 Yellow was printed using another roller coater, whereby Test Panel 1 with a speckled pattern of white, yellow and rouge was prepared.

Test Panel 2

On a polycarbonate plate (of a product of the firm Asahi Glass Co. with a Trade name of MR-4000) having a thickness of 0.35 mm, a pattern was printed with a printing ink MZ-5-K-White (Trademark) of the firm Tokyo Printing Ink in a thickness of 1 μm using a roller coater. On the so printed plate, further printings were applied with printing inks MZ-R-561 Yellow and MZ-R-3003 Rouge (Trademarks) of the firm Tokyo Printing Ink using each different roller coater in a thickness of each 1.5 μm, whereby a coating Test Panel 2 having a speckled pattern of white, yellow and rouge was obtained.

Test Panel 3

On a glass plate having a thickness of 2 mm, a pattern was printed with a printing ink TSP-300 Blue (Trademark) of the firm Tokyo Printing Ink in a thickness of 1 μm using a hand roller. On the so printed plate, a further printing was applied locally with a printing ink TSP-300 Yellow (Trademark) of the same firm using another hand roller in a thickness of 2 μm, whereby a coating Test Panel 3 having a speckled pattern of blue and yellow was obtained.

Test Panel 4

On a ceramic paper "Moasheet" (Trademark) of the firm Awa Paper Mfg., a pattern was printed locally with a printing ink TSP-300 White (Trademark) of the firm Tokyo Printing Ink Mfg. Co. Ltd., in a thickness of 3.0 μm using a hand roller. On the so printed paper, further printings were applied also locally with printing inks TSP-300 Yellow and TSP-300 Black (Trademarks) of the same firm using each different hand roller each in a thickness of 3.0 μm, whereby a coating Test Panel 4 having a speckled pattern of white, yellow and black was obtained.

Test Panel 5

On a zinc-plated steel plate of a size of 0.6 mm×100 mm×200 mm, which had been subjected to a chemical surface treatment, a layer of primer coating was applied using a roller coater with a primer paint Dynapol L-205 (Trademark) of the firm Dynamit Nobel Chemie and the plate was baked at 250° C. for 60 seconds to obtain a primer coating having a thickness of dry coating film of 5 μm. On the so precoated plate, a base coat was applied using a roller coater with Precolor No. 3100 Special White (Trademark) of the firm Nippon Oils & Fats Co. and the so coated plate was baked at 250° C. for 60 sec. to obtain a base coating having a dry coating film thickness of 10 μm. On this base coat, a pattern was printed with a printing ink formulated by diluting a commercial metal printing ink "MZ-R-561 Yellow" (Trademark) of the firm Tokyo Printing Ink Mfg. Co., Ltd. with ethylene glycol monobutyl ether to a viscosity of 500 poise (25° C.), using a roller coater in a printing layer thickness of 1.5 μm. On this plate, a further pattern of another printing ink "MZ-R-3003 Rouge" (Trademark) of the firm Tokyo Printing Ink formulated beforehand in the same manner as MZ-R-561 Yellow was printed using another roller coater, whereby Test Panel 5 with a speckled pattern of white, yellow and rouge was prepared.

Test Panel 6

On a polycarbonate plate (of a product of the firm Ashai Glass Company with a Trade name of MR-4000) having a size of 0.6 mm×100 mm×200 mm, a pattern was printed with a printing ink MZ-5-K-White (Trademark) of the firm Tokyo Printing Ink in a thickness of 1.0 μm using a roller coater. On the so printed plate, further printings were applied each locally, in the same manner as in the case of Test Panel 1, with printing inks MZ-R-561 Yellow and MZ-R-3003 Rouge (Trademarks) of the firm Tokyo Printing Ink each using an isolate roller coater in a thickness of each 1.5 μm, whereby a coating Test Panel 6 having a speckled pattern of white, yellow and rouge was obtained.

Test Panel 7

On a galvanized steel plate having a size of 0.6 mm×100 mm×200 mm, which had been subjected to a chemical surface treatment, a layer of primer coating was applied using a roller coater with a primer paint Precolor Primer NP 21B (Trademark) of the firm Nippon Oils & Fats Co. and the plate was baked at 250° C. for 60 seconds to obtain a primer coating having a dry coating film thickness of 5 μm. On the so precoated plate, a base coat was applied using a roller coater with Precolor No. 2510 White (Trademark) of the firm Nippon Oils & Fats Co. and the so coated plate was baked at 250° C. for 60 sec. to obtain a base coating having a dry coating film thickness of 10 μm. On this base coat, a pattern was printed with a printing ink formulated by diluting a commercial metal printing ink "MZ-R-561 Yellow" (Trademark) of the firm Tokyo Printing Ink Mfg. Co. with ethylene glycol monobutyl ether to a viscosity of 500 pois (25° C.), using a roller coater in a printing layer thickness of 1.5 μm. On this plate, a further pattern of another printing ink "MZ-R-3003 Rouge" (Trademark) of the firm Tokyo Printing Ink formulated beforehand in the same manner as MZ-R-561 Yellow was printed using another roller coater, whereby Test Panel 7 with a speckled pattern of white, yellow and rouge was prepared.

EXAMPLE 1

A clear paint of "Polylure No. 2000 WR Clear" (Trademark; based on polyester resin) of the firm Nippon Oils & Fats was diluted with xylol to a viscosity of 120 sec. (25° C.) of Ford Cup No. 4). With this diluted paint, the coating Test Panel 1 was coated using a roller coater in varying coating film thichnesses. The so coated Test Panel was baked at 260° C. for 90 sec. A crepe-like coating having three sections of dry coating layer thicknesses of 15 μm, 40 μm and 80 μm respectively was obtained. The crepe-like pattern on each section exhibited a relieved speckled pattern with an appearance of soft textural feeling.

EXAMPLE 2

A wrinkle clear paint "Wrinkle finish Clear, Polyester F5-552" (Trademark; based on polyester resin) of the firm AB Svensk Forgindustry was diluted with xylol to a coating viscosity of 30 sec. (25° C.) of Ford cup No. 4. With this diluted paint, the coating Test Panel 2 was coated by spray coating and the so coated Test Panel was baked at 120° C. for 30 min., whereby a crepe-like coating having a dry coating layer thicknesses of 40 μm was obtained. The resulting crepe-like pattern exhibited a relieved speckled pattern with an appearance of soft textural feeling.

EXAMPLE 3

A wrinkle clear paint "Wrinkle Polylure No. 2000 Clear" (Trademark; based on polyester resin) of the firm The Glidden Company was diluted with xylol to a coating viscosity of 120 sec. (25° C.) of Ford cup No. 4. With this diluted paint, the coating Test Panel 3 was coated using a bar-coater and the so coated Test Panel was baked at 150° C. for 20 min., whereby a crepe-like coating having a dry coating layer thickness of 50 μm was obtained. The resulting crepe-like pattern exhibited a relieved speckled pattern with an appearance of soft textural feeling.

EXAMPLE 4

A wrinkle black enamel paint "Wrinkle" (Trademark; based on phenol resin) of the firm Ohashi Chemical Ind., Ltd., Japan was diluted with xylol to a coating viscosity of 120 sec. (25° C.) of Ford cup No. 4. With this diluted paint, the coating Test Panel 4 was coated using a roller coater and the so coated Test Panel was baked at 250° C. for 90 sec., whereby a crepe-like coating having a dry coating layer thickness of 40 μm was obtained. The resulting crepe-like pattern exhibited a relieved pattern with an appearance of soft textural feeling.

The results of Examples 1-4 are summarized in Table 1.

"Nikalac MW-22" (Trademark; a methylated melamine resin with 70% solid content) of the firm Sanwa Chemical, 5 parts of a blocked acid catalyst consisting of dodecylbenzenesulfonic acid masked with triethylamine and 0.5 part of a levelling agent "Modaflow" (Trademark) of the firm Monsanto Chemical Co. and dispersing the mixture using a dissolver for 30 minutes. The so obtained paint composition was diluted with xylol to a coating viscosity of 120 sec. (25° C.) of Ford cup No. 4. With this diluted paint, the coating Test Panel 5 was coated using a bar-coater and the so coated Test Panel was baked at 260° C. for 2 minutes, whereby a crepe-like coating having a dry coating film thickness of 15 μm was obtained. The resulting crepe-like pattern exhibited a relieved speckled pattern with an appearance of soft textural feeling.

The composition of the paint and properties of the coating obtained are recited in Table 3.

EXAMPLES 6-18

A wrinkle paint composition was prepared in each of the Examples 6-18 by mixing and dispersing the composition components as given in Table 2 using a dissolver as in Example 5. A dispersing time of 30 minutes was employed in Examples 6-15 and 60 minutes in Examples 16-18. In Examples 6-13 and 17-18, the wrinkle paint compsition was diluted with xylol to obtain a coating viscosity of 120 sec. (25° C.) of Ford cup No. 4 and the so diluted paint was coated on the coating Test Panel 5 using a bar-coater and the resulting coating was baked at 260° C. for 2 minutes in Examples 6-13 and at 280° C. for 2 minutes in Examples 17 and 18. Decorative patterned materials having coating film thicknesses of 30 μm for the Examples 6, 9-13 and 17-18, 80 μm for Example 7 and 60 μm for Example 8 were obtained. In Examples 14-16, the wrinkle paint composition was diluted with xylol so as to reach a coating viscosity of 25 sec. (25° C.) of Ford cup No. 4 and the so diluted paint was coated on the coating Test Panel 6 in Example 14, on the coating Test Panel 3 in Example 15 and on the coating Test Panel 4 in Example 16 by air spray

TABLE 1

| Example No. | Coating Test Panel No. | Baking Condition of Coating[1] Temp. °C. | Baking Condition of Coating[1] Time min. | Thickness of Dry Coating Film (μm)[2] | Crepe-like Appearance (Visual Evaluat.)[3] | Relieved Appearance (Visual Evaluat.)[4] | Processibility (4T-bending)[5] | Corrosion Resist. (500 hr)[6] | Weather ability (Outdoor 1 year)[7] | Storage[8] Stability of Paint (6 mo. at R. Temp.) | Luster[9] |
|---|---|---|---|---|---|---|---|---|---|---|---|
| 1 | 1 | 260 | 1.5 | 15 40 80 | Better | Better | Better | Better | Better | Better | 5 |
| 2 | 2 | 120 | 30 | 40 | Better | Better | — | — | Better | Better | 6 |
| 3 | 3 | 150 | 20 | 50 | Better | Better | — | — | Better | Better | 4 |
| 4 | 4 | 250 | 1.5 | 40 | Better | Better | — | — | — | Better | 3 |

Notes:
[1]Designated temperature on the temperature indicator of hot air drying furnace and residence time (min.) in the furnace.
[2]Coating was effected under the same condition on a cold rolled steel sheet (SPCC-B). The thickness was determined using a film thickness meter (dry) Model 233 of the firm Erichsen.
[3]Visual evaluation: "Better" represents the rank in which crepe-like structure was formed over the entire surfaces.
[4]Visual evaluation: "Better" represents the rank in which a relieving appearance is obtained.
[5]According to JIS G3312-8.3 for bending test. "Better" represents the rank in which no occurrence of break down is recognized.
[6]According to JIS K5400-7.8 for brine spray test. "Better" represents the rank in which no rust formation nor swelling over the coating is recognized.
[7]Result of out-door exposure test in Okinawa-Prefecture under the condition: facing south at angle of incidence of 30°. "Better" represents the rank in which no marked color change in the coating is recognized.
[8]Paint was stored in an oil can in a constant temperature room at 25° C. for 6 months. "Better" represents the rank in which no change in the paint quality is recognized.
[9]According to JIS K5400-6.7: 60° reflection luster.

EXAMPLE 5

A wrinkle paint composition was prepared by mixing 150 parts of a silicone-modified polyester resin "Synresate D-9960W" (Trademark; with a content of non-volatile matter of 60%) of the firm DSM Resins International, 14.3 parts of an oligonuclear melamine resin method. The resulting coatings were baked at 120° C. for 30 minutes in Example 14 and at 150° C. for 20 minutes in Examples 15 and 16, whereby a patterned decorative material having a dry coating film thickness of 40 μm was obtained. All the resulting crepe-like patterns exhibited a relieved pattern with an appearance of soft textural feeling. The visual evaluation of the appearance of each patterned decorative material obtained and the coating performance of the baked coating are recited in Table 3.

COMPARISON EXAMPLES 1–12

A paint composition was prepared by mixing and dispersing each of the composition components given in Table 2 for 30 minutes using a dissolver, as in Example 5. The so prepared paint composition was either diluted with the mixed solvent given in Table 2 in Comparison Example 10 or with xylol in the other Comparison Examples to attain a coating viscosity of 120 sec. (25° C.) of Ford cup No. 4 and the so diluted paint was applied on the coating Test Panel 5 using a bar-coater. The condition of baking of the coating and the dry coating film thickness for each Comparison Example are recited in Table 3.

In the Comparison Examples 5, 6 and 10, triethylamine and p-toluenesulfonic acid were admixed upon stirring using the dissolver together with the resin to formulate each paint. In Comparison Example 11, an embossed pattern having a depth of 0.5 mm was formed on the coating layer using an embossing roller.

As is seen from Tables 2 and 3, each a patterned decorative material was obtained in Examples 5–13 and 17–18 using a printed steel sheet with a varying wrinkle paint among those in which different kinds of hydroxyl group-containing polyester resins and oliginuclear melamine resins were employed in varying proportions of them, to obtain various dry coating film thicknesses.

As the acid catalyst, a sulfo-compound masked with a tertiary amino compound for Examples 5–9, a sulfo-compound masked with a secondary amino compound for Examples 10–12 and an aliphatic sulphonic acid for Examples 13 and 17–18 was employed respectively.

Patterned decorative materials were obtained by applying the wrinkle paint onto a plastic plate in Example 14, onto a glass plate in Example 15 and onto a ceramic paper in Example 16.

The wrinkle paints employed in Examples 5–15 were clear paint, whereas those in Examples 16–18 were enamel paint.

As seen from Table 3, better crepe-like appearances and relieved patterns were obtained in Examples 5–18. The paints employed in Examples 5–18 were superior in the 6 months storage stability and in the 1 year weatherability. The coatings in Examples 5–13 and 17–18 were excellent in the processibility and in corrosion resistance.

In Comparison Example 1, an oligonuclear melamine resin in an amount less than 5 parts by weight was used. In Comparison Example 2, the same oligonuclear melamine resin was used in an amount exceeding 60 parts by weight.

Comparison Example 3 describes the case in which the amount of the blocked acid catalyst is smaller than 0.1 part by weight and Comparison Example 4 the case in which this amount exceeds 5 parts by weight.

Comparison Example 5 represents the case in which the mole ratio of amino compound to sulfo-compound is short of 0.5 and Comparison Example 6 the case in which this mole ratio exceeds 7.

In Comparison Examples 7 and 8, melamine resins other than that defined according to the present invention are employed and, in Comparison Example 9, a wrinkle paint incorporating cobalt naphthenate for the dryer and a modified alkyd resin having unsaturation bond is used.

In Comparison Example 10, a modified urea resin containing secondary amine was used. In Comparison Example 11, a three dimensional pattern was formed by an embossing process step. Comparison Example 12 illustrates the case in which a relieved appearance was attained using glass beads.

In Comparison Examples 1–8, not only the crepe-like appearance but also the quality of relieved pattern was inferior. Comparison Example 9 showed that the corrosion resistance, weatherablity and storage stability of paint were inferior. In Comparison Example 10, the processibility, weatherability and the storage stability of the paint were worse. In Comparison Example 11, inferior crepe-like pattern and corrosion resistance were observed and, in Comparison Example 12, the appearance of crepe-like pattern, processibility, corrosion resistance and storage stability were estimated to be worse.

Comparison Examples 1, 2, 4 and 6 showed that the processibility, corrosion resistance and weatherability were inferior. Comparison Examples 3 exhibited inferior corrosion resistance and weatherability. Comparison Example 5 showed an inferior storage stability of paint.

TABLE 2

Paint Composition

| Component | Compound | Examples |  |  |  |  |  |  |  |  |  |  |  |  |  | Comparison Examples |  |  |
|---|---|---|---|---|---|---|---|---|---|---|---|---|---|---|---|---|---|---|
|  |  | No. 5 | No. 6 | No. 7 | No. 8 | No. 9 | No. 10 | No. 11 | No. 12 | No. 13 | No. 14 | No. 15 | No. 16 | No. 17 | No. 18 | No. 1 | No. 2 | No. 3 |
| Resin | Synresate D-9960 W[1] | 150 |  |  |  |  | 150 |  |  |  |  |  |  |  |  | 162 | 50 | 133 |
|  | Beckolite M-6003-60[2] |  | 133 |  |  |  |  | 133 |  |  | 133 | 133 | 133 |  |  |  |  |  |
|  | Beckolite M-6601-S[3] |  |  | 117 |  |  |  |  | 117 | 117 |  |  |  |  | 150 | 133 |  |  |  |
|  | Burnock D-130-75[4] |  |  |  | 100 |  |  |  |  |  |  |  |  |  |  |  |  |  |
|  | Beckosol EL-6501-70[5] |  |  |  |  | 107 |  |  |  |  |  |  |  |  |  |  |  |  |
|  | Halfsecondbutyrate[6] |  |  |  |  |  |  |  |  |  |  |  |  |  |  |  |  |  |
|  | Epon 812[7] |  |  |  |  |  |  |  |  |  |  |  |  |  |  |  |  |  |
| Curing Agent | Nikalac MW-22[8] | 14.3 |  |  |  |  | 14.3 |  |  |  |  |  |  | 14.3 |  | 4.3 |  |  |
|  | Cymel 303[9] |  | 20.0 | 37.5 |  |  |  | 20.0 |  |  | 20.0 | 20.0 | 20.0 |  | 20.0 |  | 7.0 | 25.0 |
|  | Suminal M-40 s[10] |  |  |  | 47.6 |  |  |  | 37.5 | 37.5 |  |  |  |  |  |  |  |  |
|  | Cymel 1130-285J[11] |  |  |  |  |  |  |  |  |  |  |  |  |  |  |  |  |  |
|  | Resimin 755[12] |  |  |  |  | 20.0 |  |  |  |  |  |  |  |  |  |  |  |  |
|  | Uformite F-240[13] |  |  |  |  |  |  |  |  |  |  |  |  |  |  |  |  |  |
|  | Uban 120[14] |  |  |  |  |  |  |  |  |  |  |  |  |  |  |  |  |  |
|  | Superbeckamin J-820-60[15] |  |  |  |  |  |  |  |  |  |  |  |  |  |  |  |  |  |
| Blocked Acid Catalyst | TEA-DDBSA[16] | 5.0 |  |  |  |  |  |  |  |  |  |  |  |  |  | 2.5 |  |  |
|  | TEA-PTS[17] |  | 2.5 |  |  |  |  |  |  |  |  | 2.5 |  |  |  |  | 2.5 |  |
|  | TEA-DNNDSA[18] |  |  | 10.0 |  |  |  |  |  |  |  |  | 2.5 |  |  |  |  | 0.4 |
|  | MM-DDBSA[19] |  |  |  | 20.0 |  |  |  |  |  |  |  |  |  |  |  |  |  |
|  | MM-PTS[20] |  |  |  |  | 1.0 |  |  |  |  |  |  |  |  |  |  |  |  |
|  | MM-DNNDSA[21] |  |  |  |  |  | 5.0 |  |  |  | 2.5 |  |  |  |  |  |  |  |
|  | DIPA-DDBSA[22] |  |  |  |  |  |  |  |  |  |  |  |  |  |  |  |  |  |
|  | DPA-PTS[23] |  |  |  |  |  |  | 10.0 |  |  |  |  |  |  |  |  |  |  |
|  | DEA-DNNDSA[24] |  |  |  |  |  |  |  | 20.0 |  |  |  |  |  |  |  |  |  |
|  | TEA-DDSA[25] |  |  |  |  |  |  |  |  | 20.0 |  |  |  |  |  |  |  |  |
|  | EP-ODOESA[26] |  |  |  |  |  |  |  |  |  |  |  |  | 5.0 |  |  |  |  |
|  | NP-OOESA[27] |  |  |  |  |  |  |  |  |  |  |  |  |  | 2.5 |  |  |  |
|  | Triethylamine |  |  |  |  |  |  |  |  |  |  |  |  |  |  |  |  |  |
|  | p-Toluenesulfonic Acid[28] |  |  |  |  |  |  |  |  |  |  |  |  |  |  |  |  |  |
|  | Cobalt Naphthenate[29] |  |  |  |  |  |  |  |  |  |  |  | 2.0 | 2.0 |  |  |  |  |
| Others | Cyanine Green #4447[30] |  |  |  |  |  |  |  |  |  |  |  | 0.5 | 0.5 |  |  |  |  |
|  | Leveling agent[31] | 0.5 | 0.5 | 0.5 | 0.5 | 0.5 | 0.5 | 0.5 | 0.5 | 0.5 | 0.5 | 0.5 |  |  | 0.5 | 0.5 | 0.5 | 0.5 |
|  | Titanium dioxide |  |  |  |  |  |  |  |  |  |  |  |  |  | 100.0 |  |  |  |
|  | Mixd solvent[32] |  |  |  |  |  |  |  |  |  |  |  |  |  |  |  |  |  |
|  | Soda Lime Glass Beads[33] |  |  |  |  |  |  |  |  |  |  |  |  |  |  |  |  |  |

| Component | Compound | Comparison Examples |  |  |  |  |  |  |  |  |
|---|---|---|---|---|---|---|---|---|---|---|
|  |  | No. 4 | No. 5 | No. 6 | No. 7 | No. 8 | No. 9 | No. 10 | No. 11 | No. 12 |
| Resin | Synresate D-9960 W[1] | 133 |  |  |  |  |  |  |  |  |
|  | Beckolite M-6003-60[2] |  |  |  | 133 | 133 |  |  | 133 | 133 |
|  | Beckolite M-6601-S[3] |  |  |  |  |  |  |  |  |  |
|  | Burnock D-130-75[4] |  | 93 |  |  |  |  |  |  |  |
|  | Beckosol EL-6501-70[5] |  |  | 93 |  |  |  |  |  |  |
|  | Halfsecondbutyrate[6] |  |  |  |  |  | 143 |  |  |  |
|  | Epon 812[7] |  |  |  |  |  |  | 9.6 |  |  |
| Curing Agent | Nikalac MW-22[8] |  |  |  |  |  |  | 5.3 |  |  |
|  | Cymel 303[9] |  |  |  |  |  |  |  |  |  |
|  | Suminal M-40 S[10] |  |  |  |  |  |  |  |  |  |
|  | Cymel 1130-285J[11] | 23.8 |  |  |  |  |  |  |  |  |

TABLE 2-continued

Paint Composition

| | | | | | | | | | |
|---|---|---|---|---|---|---|---|---|---|
| | Resimin 755(12) | | 30.0 | 30.0 | | | | | |
| | Uformite F-240(13) | | | | 21.1 | | | | |
| | Uban 120(14) | | | | | | 15.6 | | |
| | Superbeckamin J-820-60(15) | | | | | | | | 33.0 33.0 |
| Blocked Acid Catalyst | TEA-DDBSA(16) | | | | | 33.0 | | | |
| | TEA-PTS(17) | | | | 2.5 | 2.5 | | | |
| | TEA-DNNDSA(18) | 30.0 | | | | | | | |
| | MM-DDBSA(19) | | | | | | | | |
| | MM-PTS(20) | | | | | | | | |
| | MM-DNNDSA(21) | | | | | | | | |
| | DIPA-DDBSA(22) | | | | | | | | |
| | DPA-PTS(23) | | | | | | | | |
| | DEA-DNNDSA(24) | | | | | | | | |
| | TEA-DDSA(25) | | | | | | | | |
| | EP-ODOESA(26) | | | | | | | | |
| | NP-OOESA(27) | | | | | | | | |
| | Triethylamine | | 0.7 | 13.6 | | | | 0.2 | |
| | p-Toluenesulfonic Acid(28) | | 2.0 | 2.0 | | | | 0.8 | |
| | Cobalt Naphthenate(29) | | | | | | 1.1 | | |
| Others | Cyanine Green #4447(30) | 0.5 | 0.5 | 0.5 | 0.5 | 0.5 | 0.5 | | 0.5 0.5 |
| | Levelling agent(31) | | | | | | | | |
| | Titanium dioxide | | | | | | 68.5 | | |
| | Mixd solvent(32) | | | | | | | | |
| | Soda Lime Glass Beads(33) | | | | | | | | 50 |

| | Compound | HAMM Content (GPC analysis) | No. of Alkyl Group in HAMM | Solid Content |
|---|---|---|---|---|
| (8) Trademark; Sanwa Chemical Co. | An oligonuclear melamine resin | 60% | 6 methyl | 70% |
| (9) Trademark; Mitsui Toatsu Chem. | An oligonuclear melamine resin | 47% | 6 methyl | 100% |
| (10) Trademark; Sumitomo Chem. Co. | An oligonuclear melamine resin | 50% | 6 methyl | 80% |
| (11) Trademark; Mitsui Toatsu Chem. | An oligonuclear melamine resin | 49% | 4.8 methyl 1.2 n-butyl | 84% |
| (12) Trademark; Monsanto Chem. Co. | An oligonuclear melamine resin | 46% | 3.5 methyl 2.5 n-butyl | 100% |
| (13) Trademark; Rohm & Haas Co. | A modified urea resin having sec. amine | — | — | 60% |
| (14) Trademark; Mitsui Toatsu Chem. | An oligonuclear melamine resin | 44% | 6 n-butyl | 95% |
| (15) Trademark; Dainippon Ink & C. | A polynuclear melamine resin | 10% | 6 n-butyl | 60% |
| | | Amine/Acid | Sulfo Group | |

Notes:
(1)Trademark; a product of DSM Resins International BV; a silicone-modified polyester resin, non-volatile matter content = 60%.
(2)Trademark; a product of Dainippon Ink & Chemicals, Inc.; an oil-free polyester resin, non-volatile matter content = 60%.
(3)Trademark; a product of Dainippon Ink & Chemicals, Inc.; an oil-modified polyester resin, non-volatile matter content = 60%.
(4)Trademark; a product of Dainippon Ink & Chemicals, Inc.; a polyol resin for polyurethane paint, non-volatile matter content = 75%.
(5)Trademark; a product of Dainippon Ink & Chemicals, Inc.; a modified alkyd resin, non-volatile matter content = 70%.
(6)Trademark; a product of Eastmann Chemical Product; a cellulose acetate butrlate resin, non-volatile matter content = 100%.
(7)Trademark; a product of Shell Chemical; an epoxy resin, non-volatile matter content = 100%.

TABLE 2-continued

Paint Composition

| | Mole Ratio | Content (%) | |
|---|---|---|---|
| (16) Triethylamine/Dodecylbenzenesulfonic acid | 1.0/1.0 | 20 | B.P. of triethylamine: 89.7° C./760 mmHg |
| (17) Triethylamine/p-Toluenesulfonic acid | 2.0/1.0 | 20 | B.P. of triethylamine: 89.7° C./760 mmHg |
| (18) Triethylamine/Dinonylnaphthalenedisulfonic acid | 5.0/1.0 | 20 | B.P. of triethylamine: 89.7° C./760 mmHg |
| (19) N—Methylmorpholine/Dodecylbenzenesulfonic acid | 1.0/1.0 | 20 | B.P of N-methylmorpholine: 115–116° C./750 mmHg |
| (20) N—Methylmorpholine/p-Toluenesulfonic acid | 2.0/1.0 | 20 | B.P. of N-methylmorpholine: 115–116° C./750 mmHg |
| (21) N—Methylmorpholine/Dinonylnaphthalenedisulfonic acid | 5.0/1.0 | 20 | B.P. of N-methylmorpholine: 115–116° C./750 mmHg |
| (22) Diisopropylamine/Dodecylbenzenesulfonic acid | 1.0/1.0 | 20 | B.P. of diisopropylamine: 84.1 °C./760 mmHg |
| (23) Dipropylamine/p-Toluenesulfonic acid | 3.0/1.0 | 20 | B.P. of dipropylamine: 110 °C./760 mmHg |
| (24) Diethylamine/Dinonylnapthalenedisulfonic acid | 3.0/1.0 | 20 | B.P. of diethylamine: 55.5 °C./760 mmHg |
| (25) Triethylamine/Dodecanesulfonic acid | 3.0/1.0 | 20 | B.P. of triethylamine: 89.7 °C./760 mmHg |
| (26) 4-Ethylpyridine/Octadecyloxyethylsulfonic acid | 1.0/1.0 | 20 | B.P. of 4-ethylpyridine 168 °C./760 mmHg |
| (27) 4-(5-nonyl)-pyridine/Oleyloxyethylsulfonic acid | 1.0/1.0 | 20 | B.P. of 4-(5-nonyl)-pyridine: 266° C./760 mmHg |

(28) 50% solution in butanol
(29) 6% solution in toluene
(30) Trademark; an organic pigment of Toyo Printing Ink Mfg. Co. Ltd.
(31) "Modaflow" (Trademark) of Monsanto Chemical Co.
(32) Toluene/Isobutyl acetate/Acetone/Methyl isoamyl ketone (20.3/4.0/31.0/13.2)
(33) Trademark; a glass beads product of Moritex Co., with bead diameter of 2.38 mm

TABLE 3

| Example No. or Comparison Example No. | Coating Test Panel No. | Paint Formulation Resin/ Curing Agent Wt. Ratio (1) | Amount of Acid Catalyst (part) (2) | Amine/ Acid Mole Ratio (3) | Baking Condition (4) °C. | min. | Thickness of Dry Coating Film (μm) (5) | Properties of the Coating Crepe-like Appearance (Visual Eval.) (6) | Relieved Appearance (Visual Eval.) (7) | Processibility (4T-bending) (8) | Corrosion Resistance (500 hr) (9) | Weatherability (Outdoor 1 year) (10) | Paint Storage Stability (6 mo.) (11) | Luster (12) |
|---|---|---|---|---|---|---|---|---|---|---|---|---|---|---|
| Example | | | | | | | | | | | | | | |
| 5 | 5 | 90/10 | 1.0 | 1.0 | 260 | 2 | 15 | Better | Better | Better | Better | Better | Better | 5 |
| 6 | 5 | 80/20 | 0.5 | 2.0 | 260 | 2 | 30 | Better | Better | Better | Better | Better | Better | 6 |
| 7 | 5 | 70/30 | 2.0 | 5.0 | 260 | 2 | 80 | Better | Better | Better | Better | Better | Better | 6 |
| 8 | 5 | 60/40 | 4.0 | 1.0 | 260 | 2 | 60 | Better | Better | Better | Better | Better | Better | 5 |
| 9 | 5 | 80/20 | 0.2 | 2.0 | 260 | 2 | 30 | Better | Better | Better | Better | Better | Better | 8 |
| 10 | 5 | 90/10 | 1.0 | 1.0 | 260 | 2 | 30 | Better | Better | Better | Better | Better | Better | 8 |
| 11 | 5 | 80/20 | 2.0 | 3.0 | 260 | 2 | 30 | Better | Better | Better | Better | Better | Better | 7 |
| 12 | 5 | 70/30 | 4.0 | 5.0 | 260 | 2 | 30 | Better | Better | Better | Better | Better | Better | 6 |
| 13 | 5 | 70/30 | 4.0 | 3.0 | 260 | 2 | 30 | Better | Better | Better | Better | Better | Better | 5 |
| 14 | 6 | 80/20 | 0.5 | 5.0 | 120 | 30 | 40 | Better | Better | — | — | Better | Better | 5 |
| 15 | 3 | 80/20 | 0.5 | 2.0 | 150 | 20 | 40 | Better | Better | — | — | Better | Better | 7 |
| 16 | 4 | 80/20 | 0.5 | 2.0 | 150 | 20 | 40 | Better | Better | — | — | Better | Better | 6 |
| 17 | 5 | 90/10 | 1.0 | 1.0 | 280 | 2 | 30 | Better | Better | Better | Better | Better | Better | 8 |
| 18 | 5 | 80/20 | 0.5 | 2.0 | 280 | 2 | 30 | Better | Better | Better | Better | Better | Better | 7 |
| Compar. | | | | | | | | | | | | | | |
| 1 | 5 | 97/3 | 0.5 | 1.0 | 260 | 2 | 40 | Worse | Worse | Worse | Worse | Worse | Better | 85 |
| 2 | 5 | 30/70 | 0.5 | 2.0 | 260 | 2 | 40 | Worse | Worse | Worse | Worse | Worse | Better | 85 |
| 3 | 5 | 80/20 | 0.08 | 5.0 | 260 | 2 | 40 | Worse | Worse | Better | Worse | Worse | Better | 90 |
| 4 | 5 | 80/20 | 6.0 | 1.0 | 260 | 2 | 40 | Worse | Worse | Worse | Worse | Worse | Better | 90 |
| 5 | 5 | 70/30 | 1.0 | 0.4 | 260 | 2 | 40 | Worse | Worse | Better | Better | Better | Worse | 90 |
| 6 | 5 | 60/40 | 1.0 | 8.0 | 260 | 2 | 40 | Worse | Worse | Worse | Worse | Worse | Better | 87 |
| 7 | 5 | 80/20 | 0.5 | 2.0 | 260 | 2 | 40 | Worse | Worse | Better | Better | Better | Better | 84 |
| 8 | 5 | 80/20 | 0.5 | 2.0 | 260 | 2 | 40 | Worse | Worse | Better | Better | Better | Better | 82 |
| 9 | 5 | 100/0 | — | — | 100 +140 | 15 15 | 120 | Better | Better | Better | Somew. Worse | Worse | Worse | 20 |
| 10 | 5 | 61/39 | 1.6 | 0.9 | 120 +180 | 15 15 | 120 | Better | Better | Worse | Better | Worse | Worse | 10 |
| 11 | 5 | 80/20 | — | — | 260 | 2 | 60 | Worse | Better | Better | Worse (14) | Better | Better | 80 |
| | | | | | | | | | (13) | | | | | |
| 12 | 5 | 80/20 | — | — | 260 | 2 | 60 | Worse | Better | Worse | Worse | Better | Worse (15) | 20 |

Notes:
(1) Weight ratio of resin/curing gent (melamine resin or modified urea resin)
(2) Amount of blocked acid catalyst in parts by weight calculated as free acid per 100 parts by weight of, as solids, sum of the resin and the curing agent.
(3) Mole ratio of amine/sulfo-compound in the blocked acid catalyst.
(4) Designated temperature on the temperature indicator of hot air drying furnace and residence time (min.) in the furnace.
(5) Coating was effected under the same condition on a cold rolled steel sheet (SPCC-B). The thickness was determined using a film thickness meter (dry) Model 233 of the firm Erichsen.
(6) Visual evaluation: "Better" represents the rank in which crepe-like structure was formed over the entire surfaces and "Worse" denotes the rank in which no crepe-like surface structure occurred on the surface.
(7) Visual evaluation: "Better" represents the rank in which a relieving appearance is obtained and "Worse" denotes the rank in which no relieving appearance was recognized.
(8) According to JIS G3312-8.3 for bending test. "Better" represents the rank in which no occurrence of break down or cracking is observed and "Worse" denotes the rank in which break down or cracking occurred.
(9) According to JIS K5400-7.8 for salt spray test. "Better" represents the rank in which no rust formation nor swelling over the coating is recognized and "Worse" denotes the rank in which rusting or swelling of the coating occurred.
(10) Result of out-door exposure test in an urban site of Yokoahma for 1 year under the condition: facing south at an angle of incidence of 30°. "Better" represents the rank in which no marked color change is recognized and "Worse" denotes the rank in which marked color change of the coating occurred.
(11) Paint was stored in an 18 l oil can in a constant temperature room at 25° C. for 6 months. "Better" represents the rank in which no change in the paint quality is recognized and "Worse" denotes the rank in which a disorder such as skinning occurred.
(12) According to JIS K5400-6.7: 60° reflection luster.
(13) By incorporation of embossing work. Coating of the paint of Comparison Example 11 was baked and an embossing work was then effected thereon to reach an embossing depth of 0.5 mm using an embissing roller.
(14) Defect occurred at the edge portions.
(15) Beads are sedimented.

EXAMPLE 19

A wrinkle paint was prepared by mixing 180 parts of an acrylic resin "Almatex 749-7" (Trademark; with a content of non-volatile matter of 50%) of the firm Mitsui Toatsu Chemicals Inc., 14.3 parts of an oligonuclear melamine resin "Nikalac MW-22" (Trademark; a methylated melamine resin with 70% solid content) of the firm Sanwa Chemical Co., 5 parts of a blocked acid catalyst consisting of dodecylbenzenesulfonic acid masked with triethylamine and 0.5 part of a levelling agent "Modaflow" (Trademark) of the firm Monsanto Chemical and dispersing the mixture using a dissolver for 30 minutes. The so prepared paint composition was diluted with xylol to a coating viscosity of 120 sec. (25° C.) of Ford cup No. 4. With this diluted paint, the coating Test Panel 7 was coated using a bar-coater and the so coated Test Panel was baked at 260° C. for 2 min., whereby a crepe-like coating having a dry coating film thickness of 15 μm was obtained. The resulting crepe-like pattern showed a relieved pattern having an appearance of soft textural feeling.

The composition of the paint and properties of the coating obtained are recited in Table 5.

EXAMPLES 20-31

A wrinkle paint composition was prepared in each of Examples 20-31 by mixing and dispersing the composition components given in Table 4 using a dissolver as in Example 19. A dispersing time of 30 minutes was employed in Examples 20-29 and 60 minutes in Examples 30-31. In Examples 20-27 and 31, the wrinkle paint composition was diluted with xylol to obtain a coating viscosity of 120 sec. (25° C.) of Ford cup No. 4 and the so diluted paint was coated on the coating Test Panel 7 using a bar-coater and the resulting coating was baked at 260° C. for 2 minutes in Examples 20-27 and at 280° C. for 2 minutes in Example 31. Patterned decorative materials having dry coating film thicknesses of 30 μm for Examples 20, 23-27 and 31, 80 μm for Example 21 and 60 μm for Example 22 were obtained. In Examples 28-30, the wrinkle paint composition was diluted with xylol so as to reach a coating viscosity of 25 sec. (25° C.) of Ford cup No. 4 and the so diluted paint was coated on the coating Test Panel 6 in Example 28, on the coating Test Panel 3 in Example 29 and on the coating Test Panel 4 in Example 30 each by air spray method. The resulting coatings were baked at 120° C. for 30 minutes in Example 28 and at 150° C. for 20 minutes in Examples 29 and 30, whereby a decorative patterned material having a dry coating film thickness of 40 μm was obtained. All the resulting crepe-like patterns showed a relieved pattern with an appearance of soft textural feeling. The visual evaluation of the appearance of each decorative patterned material obtained and the coating performance of the baked coating are recited in Table 5.

COMPARISON EXAMPLES 13-24

A paint composition was obtained by mixing and dispersing each of the composition components given in Table 4 for 30 minutes using a dissolver as in Example 19. The so obtained paint composition was either diluted with the mixed solvent given in Table 4 in Comparison Example 22 or with xylol in other Comparison Examples to attain a coating viscosity of 120 sec. (25° C.) of Ford cup No. 4 and the so diluted paint was applied on the coating Test Panel 7 using a bar-coater. The condition of baking of the coating and the dry coating film thickness for each Comparison Example are recited in Table 5.

In the Comparison Examples 17, 18 and 22, triethylamine and p-toluenesulfonic acid were admixed upon stirring on the dissolver together with the resin to formulate each paint. In Comparison Example 23, an embossed pattern having a depth of 0.5 mm was formed on the coating layer using an embossing roller.

As is seen from Tables 4 and 5, a decorative patterned material was obtained in Examples 19-27 and 31 using a printed steel sheet with a varying wrinlke paint among those in which different kinds of hydroxyl group-containing polyester- or fluororesins and oligonuclear melamine resins were employed with varying proportions of them, to obtain various dry coating film thicknesses.

As the acid catalyst, a sulfo-compound masked with a tertiary amino compound for Examples 19-23, a sulfo-compound masked with a secondary amino compound for Examples 24-26 and an aliphatic sulphonic acid for Examples 27 and 31 was employed respectively.

Patterned decorative materials were obtained by applying a wrinkle paint onto a plastic plate in Example 28, onto a glass plate in Example 29 and onto a ceramic paper in Example 30.

The wrinkle paints employed in Examples 19-29 were clear paint, whereas those employed in Examples 30 and 31 were enamel paint.

As seen from Table 5, better crepe-like relieved patterns were obtained in Examples 19-31, which were also superior in the 6 months storage stability and in the 1 year weatherability. The coatings in Examples 19-27 and 31 were excellent in the processibility and in corrosion resistance.

In Comparison Example 13, an oligonuclear melamine resin in an amount less than 5 parts by weight was used. In Comparison Example 14, the same oligonuclear melamine resin was used in an amount exceeding 60 parts by weight.

Comparison Example 15 describes the case in which the amount of the blocked acid catalyst is less than 0.1 part by weight and Comparison Example 16 the case in which this amount exceeds 5 parts by weight.

Comparison Example 17 represents the case in which the mole ratio of amino compound to sulfo-compound is less than 0.5 and Comparison Example 18 the case in which this mole ratio exceeds 7.

In Comparison Examples 19 and 20, melamine resins other than those defined according to the present invention are employed and, in Comparison Example 21, a wrinkle paint utilizing unsaturation chemical bond is used.

In Comparison Example 22, a modified urea resin containing secondary amine was used. In Comparison Example 23, a three dimensional pattern was formed by an embossing process step. Comparison Example 24 illustrates the case in which a relieved appearance was attained using glass beads.

In Comparison Examples 13-20, not only the crepe-like appearance but also the quality of relieved pattern was inferior. Comparison Example 21 showed that the corrosion resistance, weatherablity and storage stability of paint were inferior. In Comparison Example 22, the processibility, weatherability and the storage stability of the paint were worse. In Comparison Example 23, inferior crepe-like pattern and corrosion resistance were observed and, in Comparison Example 24, the appearance of crepe-like pattern, processibility, corrosion resistance and paint storage stability were estimated to be worse.

Comparison Examples 13, 14, 16 and 18 showed that the processibility, corrosion resistance and weatherability were inferior. Corrosion resistance and weatherability were inferior for the coating of Comparison Example 15 and paint storage stability was low for the coating of Comparison Example 17.

TABLE 4

| | | Paint Composition | | | | | | | | | | | |
| | | Examples | | | | | | | | | | | |
| Component | Compound | No. 19 | No. 20 | No. 21 | No. 22 | No. 23 | No. 24 | No. 25 | No. 26 | No. 27 | No. 28 | No. 29 | No. 30 | No. 31 |
| Resin | Almatex 784[1] | | 160 | | | | | | | | | | 160 | |
| | Almatex 749-7[2] | 180 | | | | | | | | | | 160 | | |

TABLE 4-continued

| Component | Compound | | | | | | | | | | | | | |
|---|---|---|---|---|---|---|---|---|---|---|---|---|---|---|
| Resin | Almatex 784[1] | | | | | | | | | | | | | |
| | Almatex 749-7[2] | | | | | | | | | | | | | |
| | Acrydic 44-475[3] | | | 140 | | | | | | | 160 | | | 140 |
| | Lumiflon LF-200[4] | | 100 | | 133 | | | | | | | | | |
| | Cefral Coat A-100[5] | | | | | 180 | 160 | 140 | 140 | | | | | |
| | Beckosol EL-6501-70[6] | | | | | | | | | | | | | |
| | Halfsecondbutylate[7] | | | | | | | | | | | | | |
| | Epon 812[8] | | | | | | | | | | | | | |
| Curing Agent | Nikalac MW-22[9] | 14.3 | | | | 14.3 | | | | | | | | |
| | Cymel 303[10] | | 20.0 | | | | 20.0 | | | 20.0 | 20.0 | 20.0 | | |
| | Suminal M-40 S[11] | | | 37.5 | | | | 37.5 | 37.5 | | | | | 37.5 |
| | Cymel 1130-285J[12] | | | | 47.6 | | | | | | | | | |
| | Resimin 755[13] | | | | | 20.0 | | | | | | | | |
| | Uformite F-240[14] | | | | | | | | | | | | | |
| | Uban 120[15] | | | | | | | | | | | | | |
| | Superbeckamin J-820-60[16] | | | | | | | | | | | | | |
| Blocked Acid Catalyst | TEA-DDBSA[17] | 5.0 | | | | | | | | | | | | |
| | TEA-PTS[18] | | 2.5 | | | | | | | | 2.5 | 2.5 | | |
| | TEA-DNNDSA[19] | | | 10.0 | | | | | | | | | | |
| | MM-DDBSA[20] | | | | 20.0 | | | | | | | | | |
| | MM-PTS[21] | | | | | 1.0 | | | | | | | | |
| | MM-DNNDSA[22] | | | | | | | | | 2.5 | | | | |
| | DIPA-DDBSA[23] | | | | | | 5.0 | | | | | | | |
| | DPA-PTS[24] | | | | | | | 10.0 | | | | | | |
| | DEA-DNNDSA[25] | | | | | | | | 20.0 | | | | | |
| | TEA-DDSA[26] | | | | | | | | | 20.0 | | | | |
| | NP-ODSA[27] | | | | | | | | | | | | | 10.0 |
| | Triethylamine | | | | | | | | | | | | | |
| | p-Toluenesulfonic Acid[28] | | | | | | | | | | | | | |
| | Cobalt Naphthenate[29] | | | | | | | | | | | | | |
| Others | Cyanine Green #4447[30] | | | | | | | | | | | | 2.0 | 2.0 |
| | Levelling agent[31] | 0.5 | 0.5 | 0.5 | 0.5 | 0.5 | 0.5 | 0.5 | 0.5 | 0.5 | 0.5 | 0.5 | 0.5 | 0.5 |
| | Mixd solvent[32] | | | | | | | | | | | | | |
| | Soda Lime Glass Beads[33] | | | | | | | | | | | | | |

Particulars for the Notes [1] to [33] are given at the end of the Table.

| | | Comparison Examples | | | | | | | | | | | |
|---|---|---|---|---|---|---|---|---|---|---|---|---|---|
| Component | Compound | No. 13 | No. 14 | No. 15 | No. 16 | No. 17 | No. 18 | No. 19 | No. 20 | No. 21 | No. 22 | No. 23 | No. 24 |
| Resin | Almatex 784[1] | | | | | | | | | | | | |
| | Almatex 749-7[2] | | | | | | | | | | | | |
| | Acrydic 44-475[3] | 194 | 60 | 160 | | | | 133 | 133 | | | 133 | 133 |
| | Lumiflon LF-200[4] | | | | 133 | 117 | 117 | | | | | | |
| | Cefral Coat A-100[5] | | | | | | | | | | | | |
| | Beckosol EL-6501-70[6] | | | | | | | | | 143 | | | |
| | Halfsecondbutylate[7] | | | | | | | | | | 9.6 | | |
| | Epon 812[8] | | | | | | | | | | 5.3 | | |
| Curing Agent | Nikalac MW-22[9] | 4.3 | | | | | | | | | | | |
| | Cymel 303[10] | | 70 | | | | | | | | | | |
| | Suminal M-40 S[11] | | | 25.0 | | | | | | | | | |
| | Cymel 1130-285J[12] | | | | 23.8 | | | | | | | | |
| | Resimin 755[13] | | | | | 30.0 | 30.0 | | | | 15.6 | | |
| | Uformite F-240[14] | | | | | | | | | | | | |
| | Uban 120[15] | | | | | | | 21.1 | | | | | |
| | Superbeckamin J-820-60[16] | | | | | | | | 33.0 | | | 33.0 | 33.0 |
| Blocked Acid Catalyst | TEA-DDBSA[17] | 2.5 | | | | | | | | | | | |
| | TEA-PTS[18] | | 2.5 | | | | | 2.5 | 2.5 | | | | |
| | TEA-DNNDSA[19] | | | 0.4 | | | | | | | | | |
| | MM-DDBSA[20] | | | | 30.0 | | | | | | | | |
| | MM-PTS[21] | | | | | | | | | | | | |
| | MM-DNNDSA[22] | | | | | | | | | | | | |
| | DIPA-DDBSA[23] | | | | | | | | | | | | |
| | DPA-PTS[24] | | | | | | | | | | | | |
| | DEA-DNNDSA[25] | | | | | | | | | | | | |
| | TEA-DDSA[26] | | | | | | | | | | | | |
| | NP-ODSA[27] | | | | | | | | | | | | |
| | Triethylamine | | | | | 0.7 | 13.6 | | | | 0.2 | | |
| | p-Toluenesulfonic Acid[28] | | | | | 2.0 | 2.0 | | | | 0.8 | | |
| | Cobalt Naphthenate[29] | | | | | | | | | 1.1 | | | |
| Others | Cyanine Green #4447[30] | | | | | | | | | | | | |
| | Levelling agent[31] | 0.5 | 0.5 | 0.5 | 0.5 | 0.5 | 0.5 | 0.5 | 0.5 | 0.5 | | 0.5 | 0.5 |
| | Mixd solvent[32] | | | | | | | | | | 68.5 | | |
| | Soda Lime Glass Beads[33] | | | | | | | | | | | | 50 |

Notes:
[1] Trademark; a product of Mitsui Toatsu Chemicals Inc.; an acrylic resin, non-volatile matter content = 50%.
[2] Trademark; a product of Mitsui Toatsu Chemicals Inc.; an acrylic resin, non-volatile matter content = 50%.
[3] Trademark; a product of Dainippon Ink & Chemicals, Inc.; an acrylic resin, non-volatile matter content = 50%.
[4] Trademark; a product of Asahi Glass Co., Ltd.; a fluororesin, non-volatile matter content = 60%.
[5] Trademark; a product of Central Glass Co., Ltd.; a fluororesin, non-volatile matter content = 50%.
[6] Trademark; a product of Dainippon Ink & Chemicals, Inc,; a modified alkyd resin non-volatile matter content = 70%.
[7] Trademark; a product of Eastmann Chemical Product; a cellulose acetate butyrate resin, non-volatile matter content = 100%.
[8] Trademark; a product of Shell Chemical; an epoxy resin, non-volatile matter content = 100%.

HAMM Content    No. of Alkyl    Solid

TABLE 4-continued

|  | Compound | (GPC analysis) | Group in HAMM | Content |
|---|---|---|---|---|
| (9)Trademark; Sanwa Chemical Co.: | An oligonuclear melamine resin | 60% | 6 methyl | 70 |
| (10)Trademark; Mitsui Toatsu Chem.: | An oligonuclear melamine resin | 47 | 6 methyl | 100 |
| (11)Trademark; Sumitomo Chem. Co.: | An oligonuclear melamine resin | 50 | 6 methyl | 80 |
| (12)Trademark; Mitsui Toatsu Chem.: | An oligonuclear melamine resin | 49 | 4.8 methyl 1.2 n-butyl | 84 |
| (13)Trademark; Monsanto Chem. Co.: | An oligonuclear melamine resin | 46 | 3.5 methyl 2,5 n-butyl | 100 |
| (14)Trademark; Rohm & Haas Co.: | A modified urea resin having sec. amine | — | — | 60 |
| (15)Trademark; Mitsui Toatsu Chem.: | An oligonuclear melamine resin | 44 | 6 n-butyl | 95 |
| (16)Trademark; Dainippon Ink & C.: | A polynuclear melamine resin | 10 | 6 n-butyl | 60 |

|  | Amine/Acid Mole Ratio | Sulfo Group Content (%) |  |
|---|---|---|---|
| (17)Triethylamine/Dodecylbenzenesulfonic acid | 1.0/1.0 | 20 | B.P. of triethylamine: 89.7° C./760 mmHg |
| (18)Triethylamine/p-Toluenesulfonic acid | 2.0/1.0 | 20 | B.P. of triethylamine: 89.7° C./760 mmHg |
| (19)Triethylamine/Dinonylnaphthalenedisulfonic acid | 5.0/1.0 | 20 | B.P. of triethylamine: 89.7° C./760 mmHg |
| (20)N—Methylmorpholine/Dodecylbenzenesulfonic acid | 1.0/1.0 | 20 | B.P. of N—Methylmorpholine: 115–116° C./750 mmHg |
| (21)N—Methylmorpholine/p-Toluenesulfonic acid | 2.0/1.0 | 20 | B.P. of N—Methylmorpholine: 115–116° C./750 mmHg |
| (22)N—Methylmorpholine/Dinonylnaphthalenedisulfonic acid | 5.0/1.0 | 20 | B.P. of N—Methylmorpholine: 115–116° C./750 mmHg |
| (23)Diisopropylamine/Dodecylbenzenesulfonic acid | 1.0/1.0 | 20 | B.P. of Diisopropylamine: 84.1° C./760 mmHg |
| (24)Diisopropylamine/p-Toluenesulfonic acid | 3.0/1.0 | 20 | B.P. of Diisopropylamine: 84.1° C./760 mmHg |
| (25)Diethylamine/Dinonylnaphthalenedisulfonic acid | 3.0/1.0 | 20 | B.P. of diethylamine: 55.5° C./760 mmHg |
| (26)Triethylamine/Dodecanesulfonic acid | 3.0/1.0 | 20 | B.P. of triethylamine: 89.7° C./760 mmHg |
| (27)N—Methylpiperazine/Octadecanesulfonic acid | 1.0/1.0 | 20 | B.P. of N—methylpiperazine 132° C./760 mmHg |

(28)50% solution in butanol
(29)6% solution in toluene
(30)Trademark; an organic pigment of Toyo Printing Ink Mfg. Co. Ltd.
(31)"Modaflow" (Trademark) of Monsanto Chemical Co.
(32)Toluene/Isobutyl acetate/Acetone/Methyl isoamyl ketone (20.3/4.0/31.0/13.2)
(33)Trademark; a glass beads product of Moritex Co., with bead diameter of 2.38 mm

TABLE 5

| Example No. or Comparison Example No. | Coating Test Panel No. | Paint Preparation Resin/Curing Agent Wt. Ratio (1) | Amount of Acid Catalyst (part) (2) | Amine/Acid Mole Ratio (3) | Baking Condition (4) °C. | Baking Condition (4) min. | Thickness of Dry Coating Film (μm) (5) | Crepe-like Appearance (Visual Eval.) (6) | Relieving Appearance (Visual Eval.) (7) | Processibility (4T-bending) (8) | Corrosion Resistance (500 hr) (9) | Weatherability (Outdoor 1 year) (10) | Paint Storage Stability (6 mo.) (11) | Luster (12) |
|---|---|---|---|---|---|---|---|---|---|---|---|---|---|---|
| Example | | | | | | | | | | | | | | |
| 19 | 7 | 90/10 | 1.0 | 1.0 | 260 | 2 | 15 | Better | Better | Better | Better | Better | Better | 8 |
| 20 | 7 | 80/20 | 0.5 | 2.0 | 260 | 2 | 30 | Better | Better | Better | Better | Better | Better | 7 |
| 21 | 7 | 70/30 | 2.0 | 5.0 | 260 | 2 | 80 | Better | Better | Better | Better | Better | Better | 6 |
| 22 | 7 | 60/40 | 4.0 | 1.0 | 260 | 2 | 60 | Better | Better | Better | Better | Better | Better | 7 |
| 23 | 7 | 80/20 | 0.2 | 2.0 | 260 | 2 | 30 | Better | Better | Better | Better | Better | Better | 9 |
| 24 | 7 | 90/10 | 1.0 | 1.0 | 260 | 2 | 30 | Better | Better | Better | Better | Better | Better | 5 |
| 25 | 7 | 80/20 | 2.0 | 3.0 | 260 | 2 | 30 | Better | Better | Better | Better | Better | Better | 6 |
| 26 | 7 | 70/30 | 4.0 | 5.0 | 260 | 2 | 30 | Better | Better | Better | Better | Better | Better | 8 |
| 27 | 7 | 70/30 | 4.0 | 1.5 | 260 | 2 | 30 | Better | Better | Better | Better | Better | Better | 7 |

TABLE 5-continued

| Example No. or Comparison Example No. | Coating Test Panel No. | Paint Preparation | | | Baking Condition (4) | | Thickness of Dry Coating Film (μm) (5) | Properties of the Coating | | | | | | Luster (12) |
|---|---|---|---|---|---|---|---|---|---|---|---|---|---|---|
| | | Resin/ Curing Agent Wt. Ratio (1) | Amount of Acid Catalyst (part) (2) | Amine/ Acid Mole Ratio (3) | °C. | min. | | Crepe-like Appearance (Visual Eval.) (6) | Relieving Appear. (Visual Eval.) (7) | Processibility (4T-bending) (8) | Corrosion Resistance (500 hr) (9) | Weatherability (Outdoor 1 year) (10) | Paint Storage Stability (6 mo.) (11) | |
| 28 | 6 | 80/20 | 0.5 | 1.2 | 120 | 30 | 40 | Better | Better | — | — | Better | Better | 7 |
| 29 | 3 | 80/20 | 0.5 | 1.2 | 150 | 20 | 40 | Better | Better | — | — | Better | Better | 5 |
| 30 | 4 | 80/20 | 0.5 | 1.2 | 150 | 20 | 40 | Better | Better | — | — | Better | Better | 6 |
| 31 | 7 | 70/30 | 2.0 | 5.0 | 280 | 2 | 30 | Better | Better | Better | Better | Better | Better | 5 |
| Compar. | | | | | | | | | | | | | | |
| 13 | 7 | 97/3 | 0.5 | 1.0 | 260 | 2 | 40 | Worse | Worse | Worse | Worse | Worse | Better | 80 |
| 14 | 7 | 30/70 | 0.5 | 2.0 | 260 | 2 | 40 | Worse | Worse | Worse | Worse | Worse | Better | 79 |
| 15 | 7 | 80/20 | 0.08 | 5.0 | 260 | 2 | 40 | Worse | Worse | Better | Worse | Worse | Better | 82 |
| 16 | 7 | 80/20 | 6.0 | 1.0 | 260 | 2 | 40 | Worse | Worse | Worse | Worse | Worse | Better | 84 |
| 17 | 7 | 70/30 | 1.0 | 0.4 | 260 | 2 | 40 | Worse | Worse | Better | Better | Better | Worse | 82 |
| 18 | 7 | 60/40 | 1.0 | 8.0 | 260 | 2 | 40 | Worse | Worse | Worse | Worse | Worse | Better | 90 |
| 19 | 7 | 80/20 | 0.5 | 2.0 | 260 | 2 | 40 | Worse | Worse | Better | Better | Better | Better | 87 |
| 20 | 7 | 80/20 | 0.5 | 2.0 | 260 | 2 | 40 | Worse | Worse | Better | Better | Better | Better | 85 |
| 21 | 7 | 100/0 | — | — | 100 & 140 | 15 15 | 120 | Better | Better | Better | Somew. worse | Worse | Worse | 20 |
| 22 | 7 | 61/39 | 1.6 | 0.9 | 120 & 180 | 15 15 | 120 | Better | Better | Worse | Better | Worse | Worse | 10 |
| 23 | 7 | 80/20 | — | — | 260 | 2 | 60 | Worse | Better (13) | Better | Worse (14) | Better | Better | 80 |
| 24 | 7 | 80/20 | — | — | 260 | 2 | 60 | Worse | Better | Worse | Worse | Better | Worse (15) | 20 |

Notes:
(1) Weight ratio of the resin/curing gent (melamine resin or modified urea resin)
(2) Amount of blocked acid catalyst in parts by weight calculated as free acid per 100 parts by weight of, as solids, sum of the resin and the curing agent.
(3) Mole ratio of amine/sulfo-compound in the blocked acid catalyst.
(4) Designated temperature indicator of hot air drying furnace and residence time (min.) in the furnace.
(5) Coating was effected under the same condition on a cold rolled steel sheet (SPCC-B). The thickness was determined using a film thickness meter (dry) Model 233 of the firm Erichsen.
(6) Visual evaluation: "Better" represents the rank in which crepe-like structure was formed over the entire surfaces and "Worse" denotes the rank in which no crepe-like surface structure appeared on the surface.
(7) Visual evaluation: "Better" represents the rank in which a relieved appearance is obtained and "Worse" denotes the rank in which no relieved appearance was recognized.
(8) According to JIS G3312-8.3 for bending test. "Better" represents the rank in which no occurrence of break down or cracking is observed and "Worse" denotes the rank in which break down or cracking occurred.
(9) According to JIS K5400-7.8 for salt spray test. "Better" represents the rank in which no rust formation nor swelling over the coating is recognized and "Worse" denotes the rank in which rusting or swelling of the coating occurred.
(10) Result of out-door exposure test in an urban site of Yokoahma for 1 year under the condition: facing south at an angle of incidence of 30°. "Better" represents the rank in which no marked color change in the coating is recognized and "Worse" denotes the rank in which marked color change of the coating occurred.
(11) Paint was stored in an 18 l oil can in a constant temperature room at 25° C. for 6 months. "Better" represents the rank in which no change in the paint quality is recognized and "Worse" denotes the rank in which a disorder such as skinning occurred.
(12) According to JIS K5400-6.7: 60° reflection luster.
(13) By incorporation of embossing work. Coating of the paint of Comparison Example 11 was baked and an embossing work was then effected thereon to reach an embossing depth of 0.5 mm using an embissing roller.
(14) Defect occurred at the edge portions.
(15) Beads are sedimented.

What is claimed is:

1. A process for the production of patterned decorative materials having a coating exhibiting crepe-like relieved patterns, comprising, printing on the surface of a substrate a selected pattern with an ink and then coating over the thus-printed substrate with a wrinkle paint to form a coating with crepe-like relieved patterns corresponding to said selected ink pattern.

2. A process according to claim 1, wherein the film-forming component of the wrinkle paint comprises a thermosetting resin.

3. A process according to claim 1, wherein the film-forming component of the wrinkle paint comprises
(A) 40-95 parts by weight of a hydroxyl group-containing polymer,
(B) 5-60 parts by weight of an oligonuclear melamine resin containing at least 40% by weight of a hexakisalkoxymethyl melamine expressed by the general formula (I),

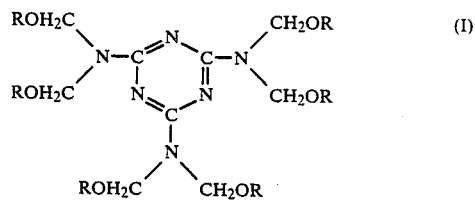

in which each R stands for an alkyl group and at least three of these R groups are methyl and less than three of the R groups are each an alkyl having 2-5 carbon atoms, and (C) 0.1-5 parts by weight of sulfo-compound, calculated on the basis of free acid compound, per 100 parts by weight of the total sum of the above (A) and (B), the sulfonic acid group of said sulfo-compound being masked by an amine having secondary and/or tertiary amino group(s) and having a boiling point of 50°-300° C.

4. A process according to claim 3, wherein said hydroxyl group-containing polymer for the wrinkle paint is one or more resins selected from the group consisting of polyester resins, acrylic resins and fluororesins.

5. A process according to claim 3, wherein the sulfocompound for the wrinkle paint is one or more aromatic sulfonic acids, selected from the group consisting of p-toluenesulfonic acid, dodecylbenzenesulfonic acid, dinonylnaphthalenesulfonic acid and dinonylnaphthalenedisulfonic acid, or one or more aliphatic sulfonic acids selected from the group consisting of those expressed by the following structural formulae (II) to (IX):

$$R^1-SO_3H, \tag{II}$$

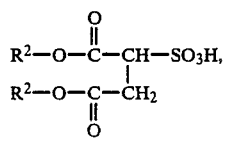  (III)

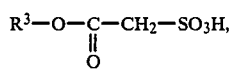  (IV)

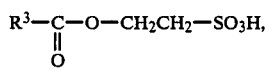  (V)

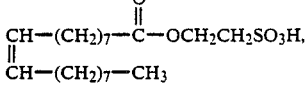  (VI)

$$R^1O-(CH_2)_{2-3}SO_3H, \tag{VII}$$
$$R^1OCH_2CH_2OCH_2CH_2SO_3H \tag{VIII}$$
and
$$R^1SCH_2CH_2SO_3H, \tag{IX}$$

wherein $R^1$ represents an alkyl group having 8–22 carbon atoms, $R^2$ denotes an alkyl group having 4–8 carbon atoms and $R^3$ is an alkyl group having 13–17 carbon atoms.

6. A process according to claim 3, wherein the amine having secondary and/or tertiary amino group(s) for the wrinkle paint is selected from the group consisting of diethylamine, dipropylamine, diisopropylamine, dibutylamine, diisobutylamine, di-2-ethylhexylamine, di-sec-butylamine, diallylamine, N-methylhexylamine, 3-pipecoline, 4-pipecoline, 2,4-lupetidine, 2,6-lupetidine, 3,5-lipetidine, morpholine, N-methylbenzylamine, N-methylmorpholine, triethylamine, tributylamine, N,N-dimethylallylamine, N-methyldiallylamine, triallylamine, N,N,N',N'-tetramethyl-1,2-diaminoethane, N,N,N',N'-tetramethyl-1,3-diaminopropane, N,N,N',N'-tetraallyl-1,4-diaminobutane, N-methylpiperidine, pyridine, 4-ethylpyridine, 4-(5-nonyl)-pyridine, imidazole and N-methylpiperadine.

7. A process according to claim 1, wherein the wrinkle paint is a clear paint, clear colored paint or an enamel paint.

* * * * *